United States Patent
Lee et al.

(10) Patent No.: US 11,858,573 B2
(45) Date of Patent: Jan. 2, 2024

(54) STEERABLE DRIVE WHEEL

(71) Applicant: Conceptual Innovations, L.L.C., Albion, MI (US)

(72) Inventors: Elmer Lee, Canton, MI (US); Tyler Bretes, Parma, MI (US); Michael Anthony Aerts, Albion, MI (US); Ryan Joseph Lotsbaich, Jackson, MI (US)

(73) Assignee: Conceptual Innovations, L.L.C., Albion, MI (US)

( * ) Notice: Subject to any disclaimer, the term of this patent is extended or adjusted under 35 U.S.C. 154(b) by 732 days.

(21) Appl. No.: 17/006,977

(22) Filed: Aug. 31, 2020

(65) Prior Publication Data

US 2021/0061352 A1 Mar. 4, 2021

Related U.S. Application Data

(60) Provisional application No. 62/893,423, filed on Aug. 29, 2019.

(51) Int. Cl.
*B62D 7/14* (2006.01)
*B62D 7/22* (2006.01)
*B60K 1/02* (2006.01)

(52) U.S. Cl.
CPC .............. *B62D 7/142* (2013.01); *B62D 7/22* (2013.01); *B60K 1/02* (2013.01)

(58) Field of Classification Search
CPC ... B60K 1/02; B62D 7/08; B62D 7/22; B62D 7/142; B66F 9/07586; B66F 9/063; B60Y 2200/66; B60Y 2200/62
See application file for complete search history.

(56) References Cited

U.S. PATENT DOCUMENTS 3,827,517 A 8/1974 Williamson et al.
4,221,273 A 9/1980 Finden et al.
(Continued)

FOREIGN PATENT DOCUMENTS

CN 208856859 U 5/2019
DE 102012025152 A1 6/2014
(Continued)

OTHER PUBLICATIONS

Maeda et al., Traveling Device for Automatic Work, Jun. 9, 2014, EPO, JP 2014-103878 A, Machine Translation of Description (Year: 2014).*

*Primary Examiner* — James A English
(74) *Attorney, Agent, or Firm* — Endurance Law Group PLC

(57) ABSTRACT

A steerable drive wheel assembly includes two independently motor-driven wheels. The wheels are supported in side-by-side orientation for independent rotation about a common horizontal rolling axis, and equally laterally offset from said vertical steering axis. The wheels and their respective drive motors are carried in a drive module that is mounted like a turret under an intermediate suspension module via a rotary bearing. The intermediate suspension module is mounted on linear bearing assemblies within an outer housing. Biasing members urge the intermediate suspension module together with its drive module downwardly to maintain traction with a floor. A compact configuration is achieved by overlapping the drive motors with the opposite wheels. Position control is achieved by a strategic sensor array. Electrical wire management is achieved by a serpentine energy chain located in the plane of the rotary bearing.

18 Claims, 17 Drawing Sheets

(56) References Cited

U.S. PATENT DOCUMENTS

| | | | |
|---|---|---|---|
| 4,529,052 | A | 7/1985 | Imai et al. |
| 4,932,489 | A | 6/1990 | Evans et al. |
| 5,924,512 | A | 7/1999 | Wada et al. |
| 6,408,230 | B2 | 6/2002 | Wada et al. |
| 7,789,175 | B2 | 9/2010 | Tobey et al. |
| 8,831,841 | B2 | 9/2014 | Mognon et al. |
| 10,106,383 | B2 | 10/2018 | Shen et al. |
| 2004/0006408 | A1* | 1/2004 | Kakutani ............... B25J 9/1679 700/213 |
| 2007/0080000 | A1* | 4/2007 | Tobey .................... A61G 5/045 180/21 |
| 2016/0231751 | A1* | 8/2016 | Mecklinger .......... G05D 1/0297 |
| 2017/0080846 | A1* | 3/2017 | Lord ........................ B60K 7/00 |
| 2018/0072212 | A1* | 3/2018 | Alfaro .................. B60K 7/0007 |
| 2020/0406733 | A1* | 12/2020 | Yamamoto ............. B60L 15/20 |
| 2021/0323621 | A1* | 10/2021 | Zhou ........................ B60K 1/00 |
| 2022/0161848 | A1* | 5/2022 | Cascajar Ordonez . B62D 1/283 |
| 2022/0194763 | A1* | 6/2022 | Canuto Gil ............ B66F 9/063 |

FOREIGN PATENT DOCUMENTS

| | | | |
|---|---|---|---|
| GB | 2276854 | A | 10/1994 |
| JP | S5539846 | A | 3/1980 |
| JP | S59157719 | A | 9/1984 |
| JP | S624630 | A | 1/1987 |
| JP | S6231524 | A | 2/1987 |
| JP | 2014103878 | A * | 6/2014 |
| KR | 101462527 | B1 | 11/2014 |
| WO | 2018115084 | A1 | 6/2018 |

\* cited by examiner

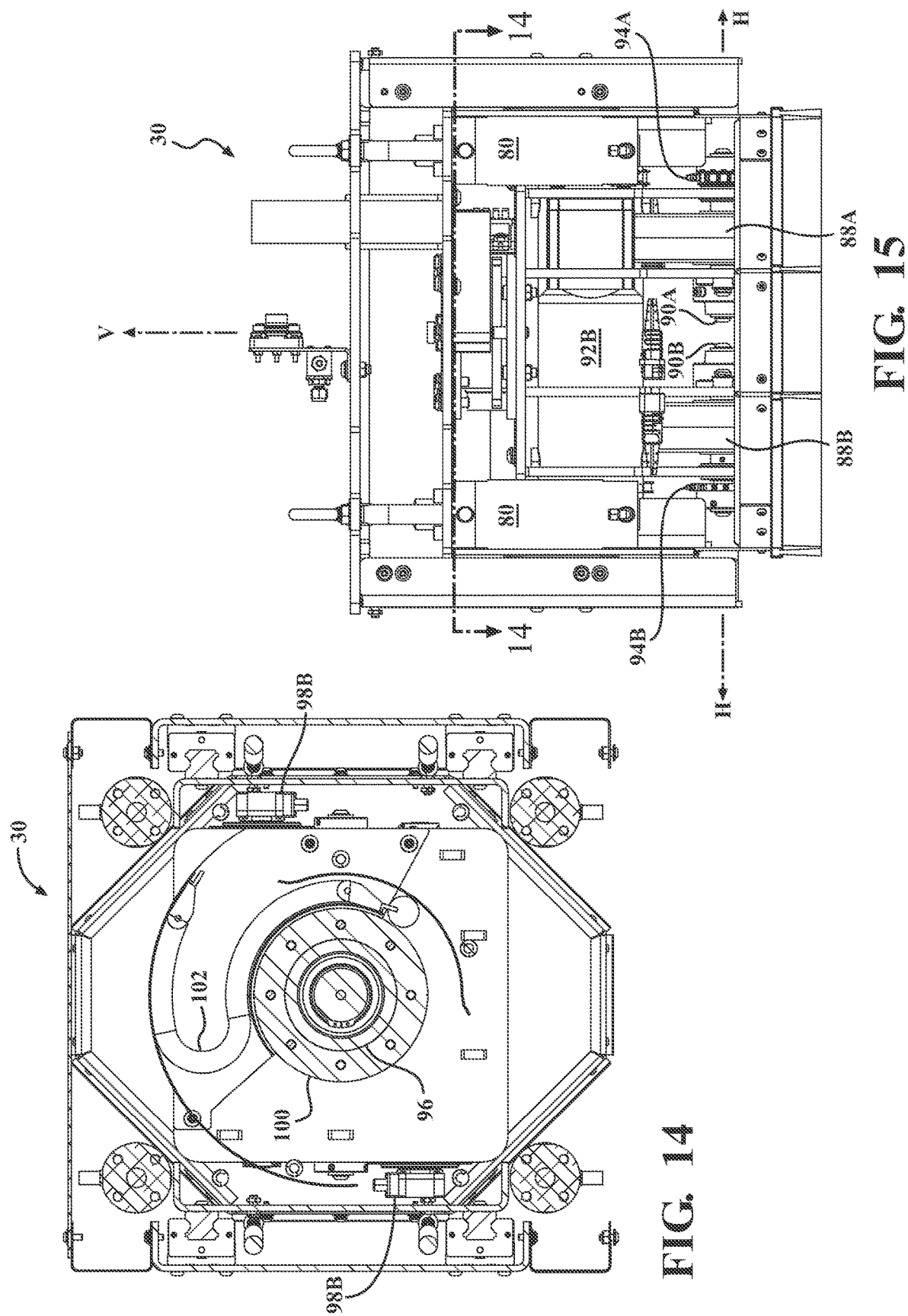

STEERABLE DRIVE WHEEL

CROSS REFERENCE TO RELATED APPLICATIONS

This application claims priority to Provisional Patent Application US 62/893,423 filed on Aug. 29, 2019, the entire disclosure of which is hereby incorporated by reference and relied upon.

BACKGROUND OF THE INVENTION

Field of the Invention. The invention relates generally to motorized carts and the like of the type used in various settings, including but not limited to industrial material handling and educational robotics, and more particularly to steerable motorized drive unit therefor.

Description of Related Art. Steerable motorized carts of all sorts are commonly used in factories and other industrial settings to transport heavy industrial materials from one location to another. In another common application, lightweight nimble steerable motorized carts are used in radio-controlled settings for educational, recreational and competitive purposes. These are merely offered as examples; steerable motorized carts may be found in many other settings as well. The term "cart" is used throughout this document in the broadest possible sense to include a frame that is supported by at least one wheel. Sometimes the direction of a motorized cart is controlled through on-board steering features so that an operator must be physically handling a yoke or some other connected feature while steering the motion of the cart. Other times, steering can be accomplished remotely via wireless (e.g., radio signal) or tethered wire controls.

Steerable drive wheels are commonly used in all of these applications to provide both motive force and directional control. Steerable drive strategies include the use of Mecanum wheels, tank drives, crab drives and so-called swerve wheels to name a few. Mecanum wheels are complex, require many component parts, are typically heavy and characteristically are plagued with traction shortcomings. They also do not have good load carry capabilities and are susceptible to damage by debris on the ground. Tank drives use two independently controlled treads. Although high on traction, tank drives have significant maneuverability limitations. A crab drive uses two sets of skid-steer drive train each pointed in a different direction (e.g., forward-reverse & left-right). Typically, only one drive engages the ground at a time. A swerve drive mounts a motorized drive wheel on a pivot so that the wheel can be steered while it is rotating in a driving direction. Swerve drives are very popular but have certain drawbacks which include: high mass (heavy), design complexity and they require two different motors (one for drive and another for steerage).

There is a need for an improved steerable drive wheel for use in all types of motorized carts. An improved steerable drive should be low-cost, low-weight, powerful, highly maneuverable, able to track straight with ease, agile, robust, adaptable, easily serviceable, scalable to a wide variety of applications and generally overcome most or all disadvantages inherent in prior art steerable drive wheel designs.

BRIEF SUMMARY OF THE INVENTION

According to a first aspect of this invention, a steerable drive wheel assembly comprises an outer housing that defines a sheltered interior space. The outer housing includes a top having opposed left and right edges. A right stabilizer arm extending downwardly from the right edge of the top. A left stabilizer arm extending downwardly from the left edge of the top. An intermediate suspension module is disposed at least partially within the sheltered interior space of the outer housing. A drive module is disposed below the intermediate suspension module. The drive module includes a first drive subassembly having a first wheel and a second drive subassembly having a second wheel. The first and second wheels are supported in side-by-side orientation for independent rotation about a common horizontal axis. The first drive subassembly includes a first drive motor operatively connected to the first wheel through a first transmission. The second drive subassembly includes a second drive motor operatively connected to the second wheel through a second transmission. A rotary bearing is operatively disposed between the drive module and the intermediate suspension module for enabling rotational movement of the drive module relative to the intermediate suspension module about a generally vertical steering axis. A first angular velocity sensor is operatively associated with the first drive motor. A second angular velocity sensor is operatively associated with the second drive motor. And an angular position sensor is operatively disposed between the drive module and the intermediate suspension module.

According to a second aspect of this invention, a steerable drive wheel assembly comprises an outer housing that defines a sheltered interior space. An intermediate suspension module is disposed at least partially within the sheltered interior space of the outer housing. A drive module is disposed below the intermediate suspension module. The drive module includes a first drive subassembly having a first wheel and a second drive subassembly having a second wheel. The first and second wheels are supported in side-by-side orientation for independent rotation about a common horizontal axis. A rotary bearing is operatively disposed between the drive module and the intermediate suspension module for enabling rotational movement of the drive module relative to the intermediate suspension module about a generally vertical steering axis. A serpentine energy chain is disposed generally co-planar with the rotary bearing.

According to a third aspect of this invention, a steerable drive wheel assembly comprises an outer housing that defines a sheltered interior space. An intermediate suspension module is disposed at least partially within the sheltered interior space of the outer housing. At least one left linear guide bearing assembly is operatively disposed between the outer housing and the intermediate suspension module. At least one right linear guide bearing assembly is operatively disposed between the outer housing and the intermediate suspension module. At least one biasing member is operatively disposed between the outer housing and the intermediate suspension module with which to urge relative movement between the intermediate suspension module and the outer housing through the left and right linear guide bearing assemblies. A drive module is disposed below the intermediate suspension module. The drive module includes a first drive subassembly having a first wheel and a second drive subassembly having a second wheel. The first and second wheels are supported in side-by-side orientation for independent rotation about a common horizontal axis. The first drive subassembly further includes a first drive motor that is operatively connected to the first wheel through a first transmission. Likewise, the second drive subassembly includes a second drive motor that is operatively connected to the second wheel through a second transmission. Each of the first and second drive motors have an armature and a stator body. A rotary bearing is operatively disposed between the drive module and the intermediate suspension module to enable rotational movement of the drive module relative to the intermediate suspension module about a generally vertical steering axis. Each of the armatures are disposed for rotation in respective axes parallel to the common horizontal axis. The stator body of the first drive motor at least partially overlaps the second wheel. And the stator body of the second drive motor at least partially overlaps the first wheel.

These several aspects of the invention yield an improved steerable drive wheel for use in all types of motorized carts and wheeled objects, particularly within industrial and/or educational settings. The improved steerable drive assembly of this invention is low-cost, is inherently light weight, powerful, highly maneuverable, able to track straight with ease, is agile, robust, adaptable, easily serviceable, scalable to a wide variety of applications and generally overcomes most or all disadvantages inherent in prior art steerable drive wheel designs.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 14 is a cross-sectional view taken generally along lines 14-14 in FIG. 15 and showing the intermediate suspension module rotated within the outer housing oriented at a second exemplary operational angle;

FIG. 15 is a side elevation of the steerable drive wheel assembly as in FIG. 13 showing the intermediate suspension module and drive module in the second exemplary operational angle of FIG. 14;

DETAILED DESCRIPTION OF THE INVENTION

Figure 1:
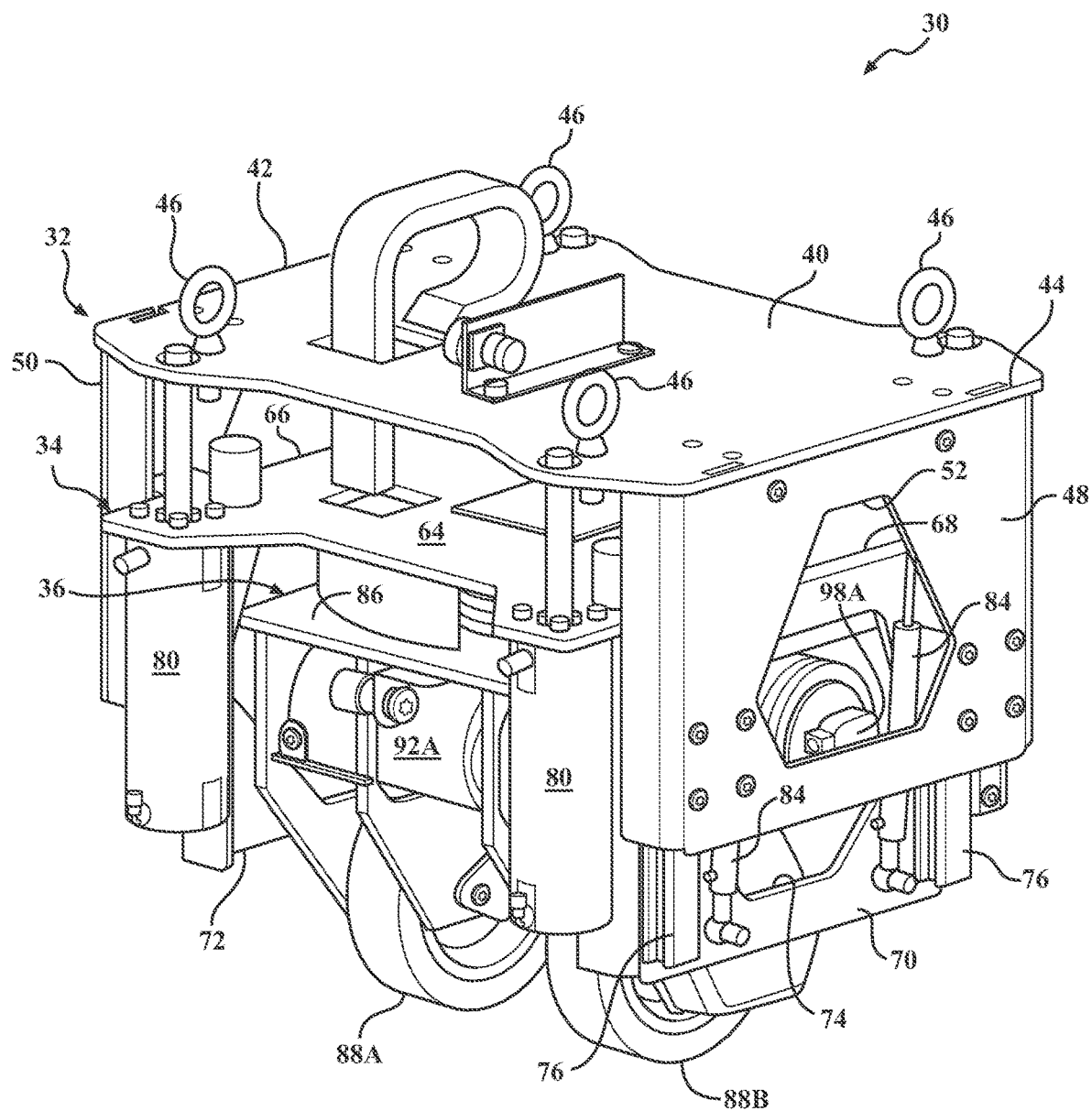
FIG. 1 is a perspective view of a steerable drive wheel assembly according to a first embodiment of the invention.

Referring to the figures, wherein like numerals indicate like or corresponding parts throughout the several views, a steerable drive wheel assembly according to a first exemplary embodiment of the invention is generally shown at 30 in FIGS. 1-17. Generally stated, the drive wheel assembly 30 is composed of three interacting sub-assemblies or components: an outer housing 32, an intermediate suspension module 34 and a drive module 36. Each component will be described in turn.

The outer housing 32 is both a structural member for the assembly 30 as well as an exterior shell within which is defined an interior space used to shelter, at least partially, the intermediate suspension module 34 and drive module 36 components. The structural attributes of the outer housing 32 arise from the fact that the assembly 30 attaches to a cart or other wheeled object through the outer housing 32. For example, FIGS. 3-6 depict two steerable drive wheel assemblies 30 joined to a lift cart 38 via their respective outer housings 32.

The outer housing 32 includes a top 40, which may take any one of many different forms. Given the structural demands required of the outer housing 32, the top 40 may be fabricated form a thick plate steel or other sturdy material. In the examples provided, the top 40 is generally flat and its shape is generally rectangular. In this generally rectangular form, the top 40 can be seen having opposed front and rear edges, along with opposed left 42 and right 44 edges. The front and rear edges can be seen to have some contour, whereas the left 42 and right 44 edges are more or less straight. Of course, these shape details are highly variable, and could be modified to suit any desired shape of the top 40, including round, oval, hexagonal, etc. Optionally, the top 40 may be fitted with one or more hoist anchors 48. FIG. 1 shows four such hoist anchors 46. Hoist anchors 46 are provided to conveniently hoist the assembly 30 for installation and maintenance.

A right stabilizer arm 48 extends perpendicularly from the right edge 44 of the top 40. Similarly, a left stabilizer arm 50 extends perpendicularly from the left edge 46 of the top 40. The right 48 and left 50 stabilizer arms are sturdy, rigid elements made from steel or other sufficiently strong material. Optionally, each stabilizer arm 48, 50 may include an external pass-through service window 52, for purposes to be described subsequently. Although not visible in FIGS. 1 and 2, for purposes of clarity, a front panel 54 extends perpendicularly from the front edge of the top 40 and directly connects each of the left 50 and right 48 stabilizer arms. Similarly, a rear panel 56 extends perpendicularly from the rear edge of the top 40 and directly connects each of the left 50 and right 48 stabilizer arms. The right 54 and/or left 56 panels can be seen in at least FIGS. 6 and 8-12. With the panels 54, 56 secured to stabilizer arms 48, 50 and these all joined to the top 40, a monolithic structure is formed having substantial structural integrity. That is, the panels 54, 56 link the stabilizer arms 48, 50 into a robust, box-like configuration that is capable of maintaining its integrity under all foreseeable combinations of vertical, lateral and torsional loading.

As mentioned previously, FIGS. 3-6 depict one exemplary application of the drive wheel assembly 30 in the context of an industrial lift cart 38. Those of skill in the art will know that lift carts 38 can take many different forms as may be dictated by its intended purpose. In the examples shown, the lift cart 38 has a simple tubular frame supporting corner-mounted casters 58. A pair of fork tubes 60 are securely attached within the frame. The fork tubes 60 enable the lift cart 38 to be easily raised and repositioned by a forklift (not shown). In this example, outriggers 62 extend from the outer housing 32 and lock onto the fork tubes 60. In this way, the outriggers 62 can be seen as optional extensions of the outer housing 32 and serve as a special attachment feature for this type of lift cart 38 application. In other applications, it may be preferable to bolt the top 40 directly to the wheeled object to which the drive wheel assembly 30 is incorporated. Perhaps any wheeled object can be fitted with one or more drive wheel assemblies 30 to achieve steerable drive capability. The invention is described for use in industrial and/or educational robotic settings, however these are only examples and not to be construed as limiting.

The intermediate suspension module 34 is disposed at least partially within the sheltered interior space of the outer housing 32. That is to say, the intermediate suspension module 34 is located below the top 40 and in-between the left 50 and right 48 stabilizer arms, where it is protected. The intermediate suspension module 34 includes a suspension plate 64 disposed directly below the top 40 of the outer housing 32. The suspension plate 64 may be generally flat, and have a shape that corresponds, more or less, to the shape of the top 40, although smaller. That is, the suspension plate 64 may have a generally rectangular shape, although conformity to a classic geometry is not actually relevant. In this way, it can be seen that the suspension plate 64 has opposing front and rear edges that correspond, at least somewhat, to the respective front and rear edges of the top 40. Also, the suspension plate 64 has opposing left 66 and right 68 edges corresponding respectively to the left 42 and right 44 edges of the top 40. A right leg 70 extends perpendicularly from the right edge 68 of the suspension plate 64. A left leg 72 extends perpendicularly from the left edge 66 of the suspension plate 64. The intermediate suspension module 34 can be seen to take the appearance of a smaller version of the outer housing 32 (minus the panels 54, 56), with the suspension module 34 nested inside the outer housing 32. In this manner, leg stabilizer arm 50 is parallel to and lies just outside of the left leg 72. And likewise, the right leg stabilizer arm 48 is parallel to and lies just outside of the right leg 70.

Figure 2:
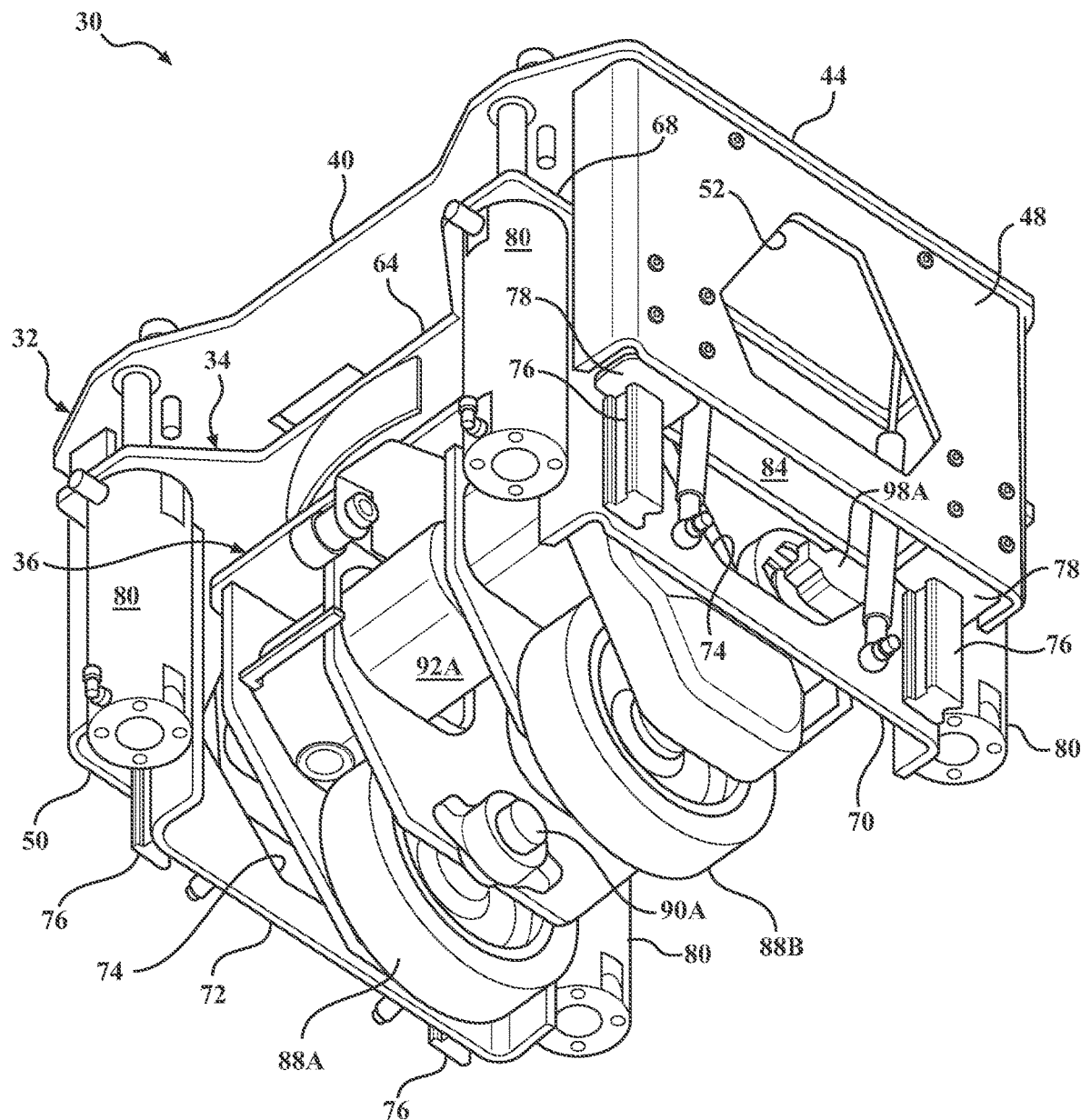
FIG. 2 is a bottom-oriented perspective view of the steerable drive wheel assembly of FIG. 1.
Figure 3:
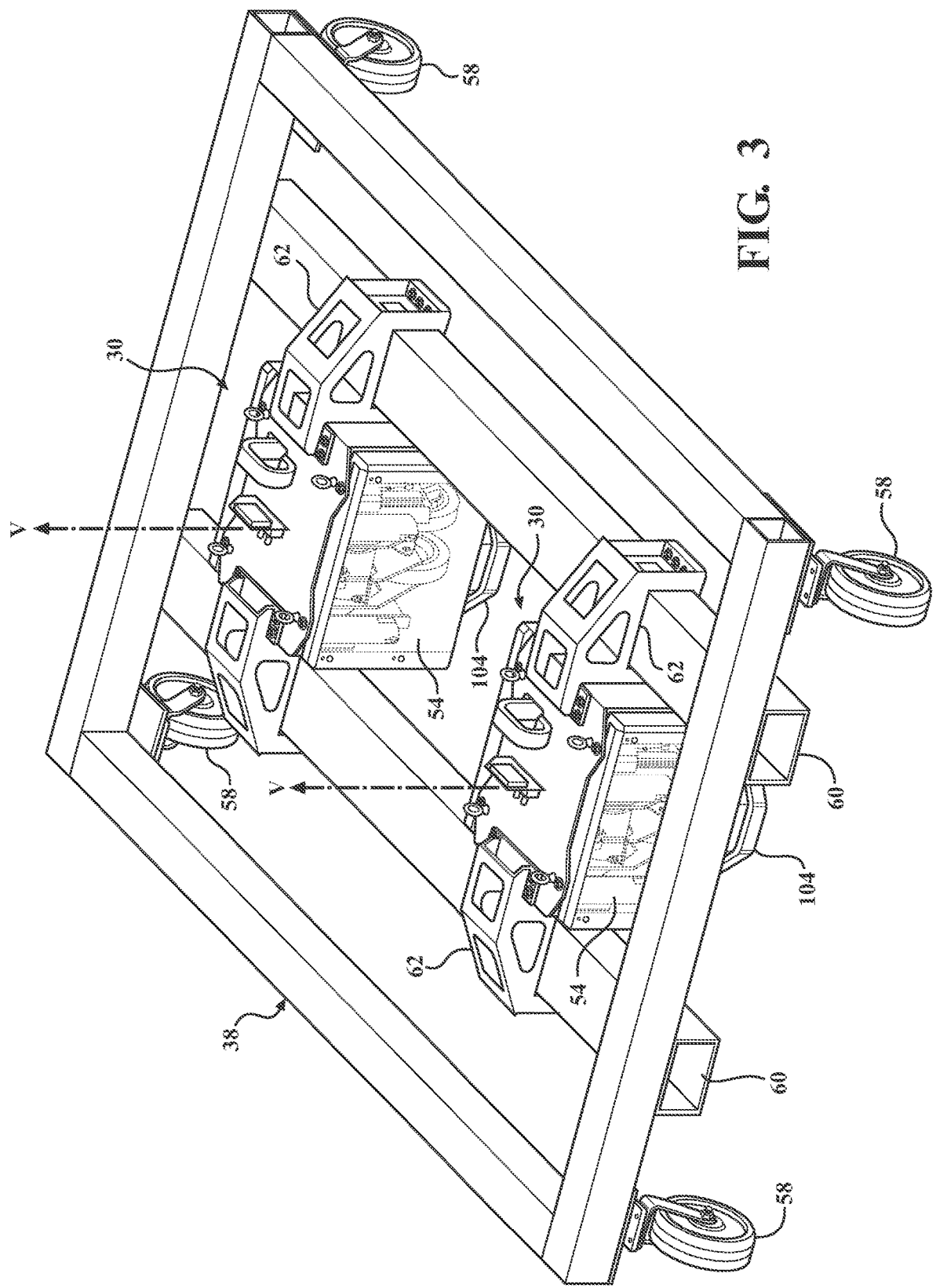
FIG. 3 is a perspective view showing two steerable drive wheel assemblies operatively mounted in an industrial lift cart.
Figure 4:
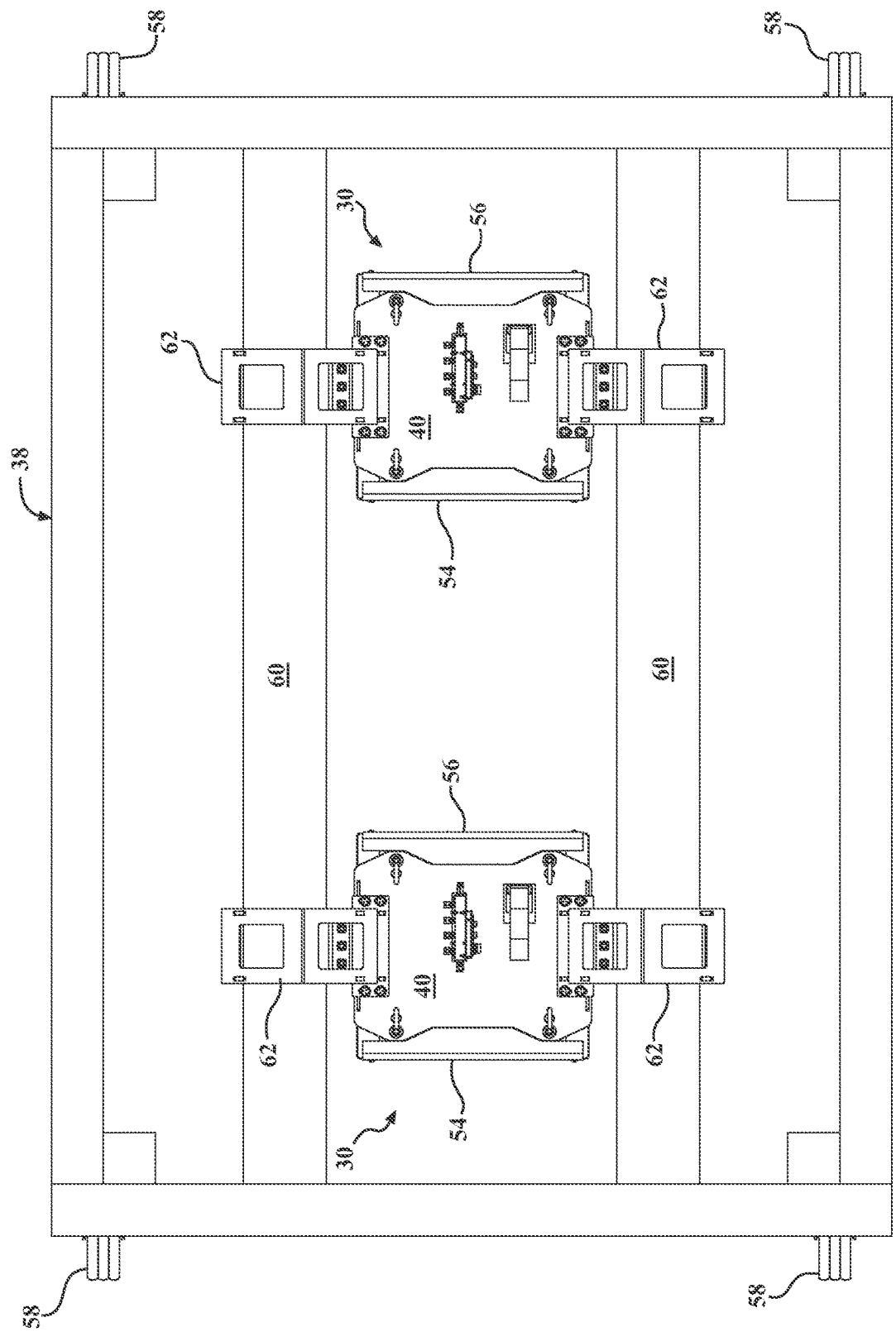
FIG. 4 is a top view of the assembly shown in FIG. 3.
Figure 5:
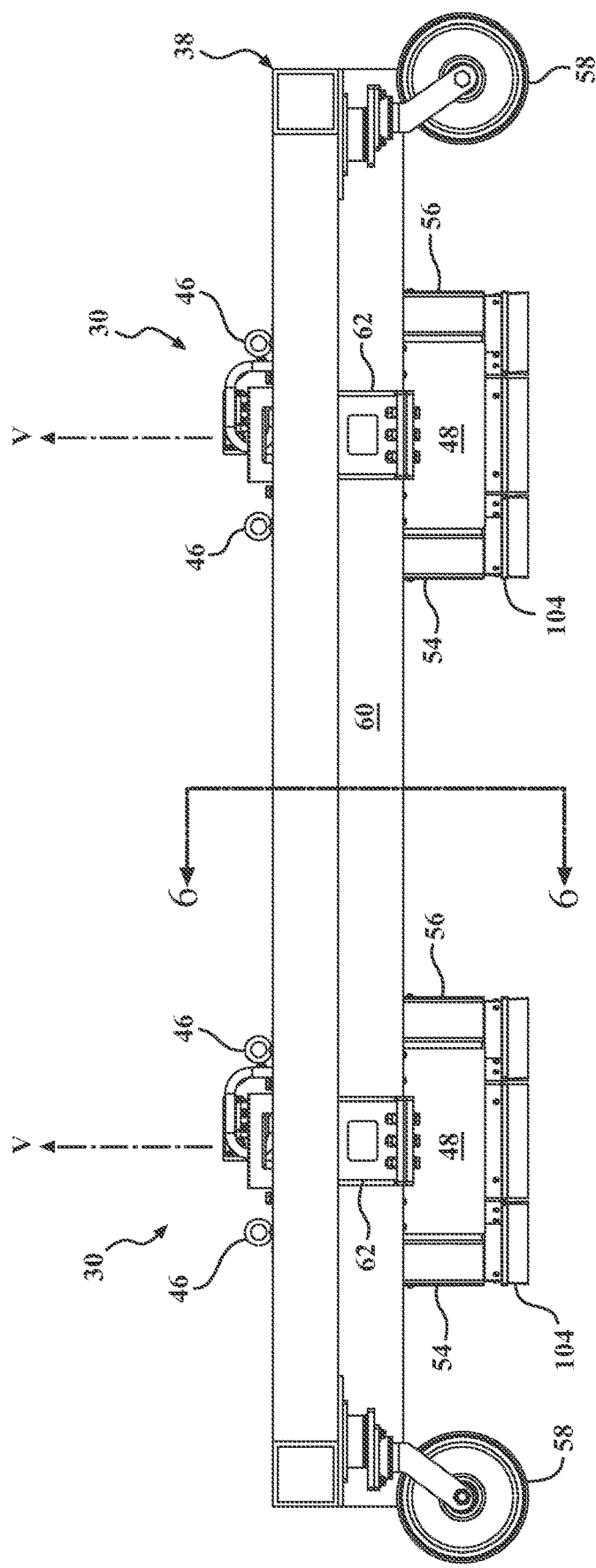
FIG. 5 is a side elevation view of the assembly of FIG. 3.

The left 66 and right 68 legs each include an interior pass-through window 74, as can be clearly seen in FIGS. 1 and 2. The interior pass-through windows 74 at least partially, but preferably substantially, overlaps the exterior pass-through service windows 52 of the respective the left 50 and right 48 stabilizer arms to provide direct access to the drive module 36 within the sheltered interior space of the outer housing 32. Thus, some light maintenance and inspections work can be accomplished through the overlapping service windows 52, 74.

At least one left linear guide bearing assembly is operatively disposed between the outer housing 32 and the intermediate suspension module 34. And likewise, at least one right linear guide bearing assembly operatively disposed between the outer housing 32 and the intermediate suspension module 34. More specifically, in the illustrated examples two left linear guide bearing assemblies are disposed between the left stabilizer arm 50 and the left leg, and two right linear guide bearing assemblies are disposed between the right stabilizer arm 48 and the right leg. Each linear guide bearing assembly includes a rail 76 fixedly attached to the outside facing surface of the respective leg 70, 72. Each rail 76 is fabricated from metal or some other sufficiently durable material. Furthermore, each linear guide bearing assembly includes a channel 78 fixedly attached to the inside facing surface of the respective stabilizer arm 48, 50. Preferably, but not necessarily, the channels 78 are fabricated from a polymeric material to provide good lubricity for a sliding interface. The rails 76 and mating channels 78 are shown having a dovetail fit configuration, however other interlocking and non-interlocking shapes are certainly possible. And of course, the attachment points of the rails 76 and channels 78 could be reversed, such that the channels 78 attach to the legs 70, 72 and the rails 76 to the arms 48, 50. As can be seen in FIG. 2, the linear guide bearing assemblies are spread apart as far as possible on each leg 70, 72 to provide maximum stability. In cases where additional stability is needed, three or more linear guide bearing assemblies may be used between each leg 70, 72 and arm 48, 50.

The linear guide bearing assemblies establish controlled sliding interfaces between the outer housing 32 and intermediate suspension module 34. Thus, when the outer housing 32 is securely attached to a lift cart 38 or some other wheeled object, the intermediate suspension module 34 is able to be raised and lowered into and out of the sheltered interior space of the outer housing 32. Guided linear extension and retraction of the intermediate suspension module 34 relative to the outer housing 32 can perhaps best be observed by comparing FIGS. 9 and 10. In these illustrations, the drive module 36, which is carried inside the intermediate suspension module 34, can be see raised about the floor surface in FIG. 9, and then lowered into contact with the floor surface in FIG. 10. This up and down movement is facilitated by the linear guide bearing assemblies.

The drive wheel assembly 30 further includes at least one biasing member 80 operatively disposed between the outer housing 32 and the intermediate suspension module 34. In the illustrated examples, four biasing members 80 are provided. The purpose of the biasing members 80 is to urge downward vertical relative movement of the intermediate suspension module 34 relative to the outer housing 32 in cooperating alignment with the linear guide bearing assemblies, and thereby improve floor traction for the drive module 36. In this context, the biasing members 80 can be generally understood as springs which, in the illustrated examples, are operatively and strategically disposed between the top 40 of the outer housing 32 and the suspension plate 64 of the intermediate suspension module 34.

In the example of FIGS. 1-17, the biasing members 80 are configured as double-acting pneumatic air cylinders attached about the four corners of the suspension plate 64.

Figure 6:
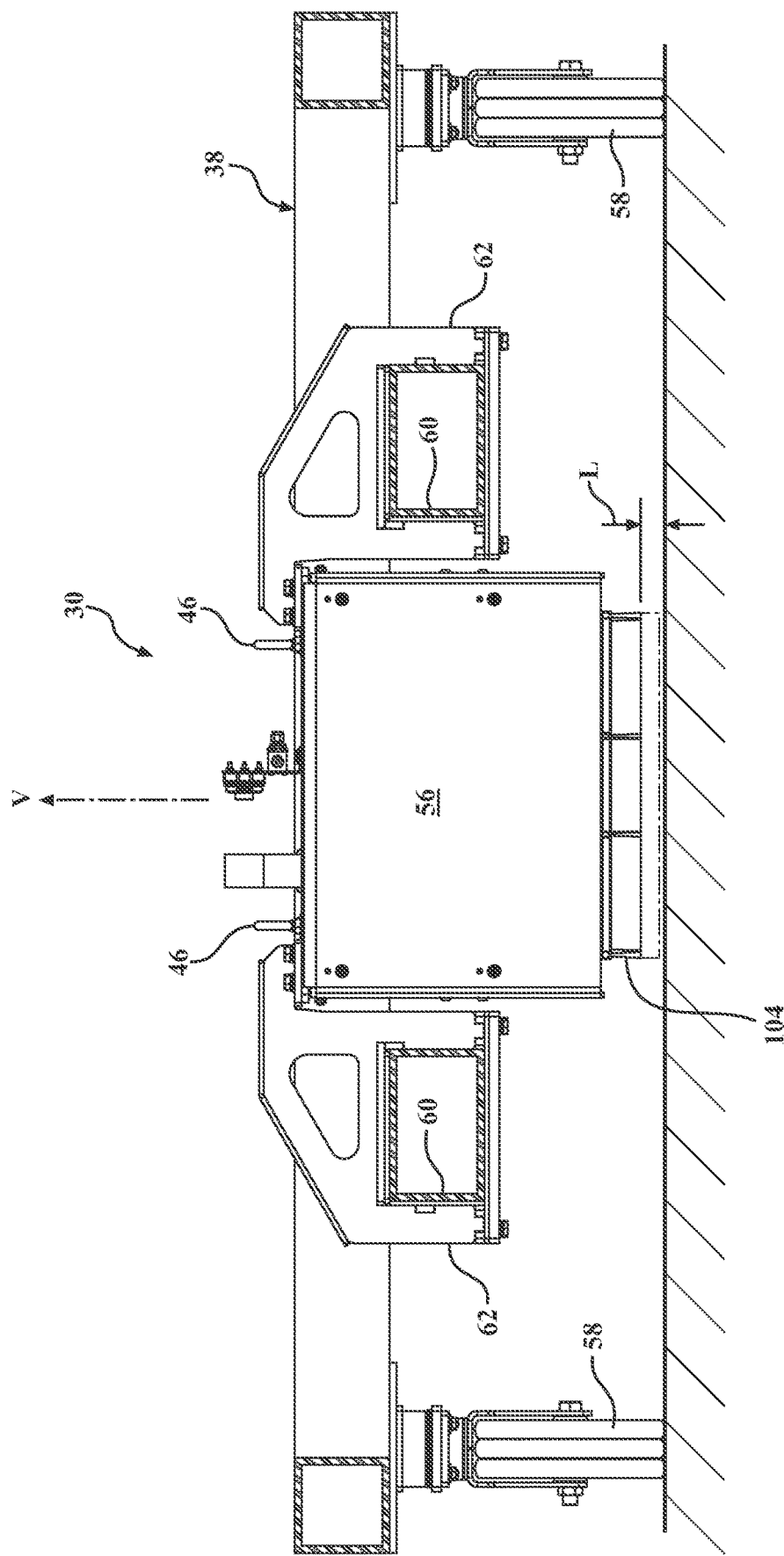
FIG. 6 is a cross-sectional view taken generally along lines 6-6 in FIG. 5.
Figure 7:
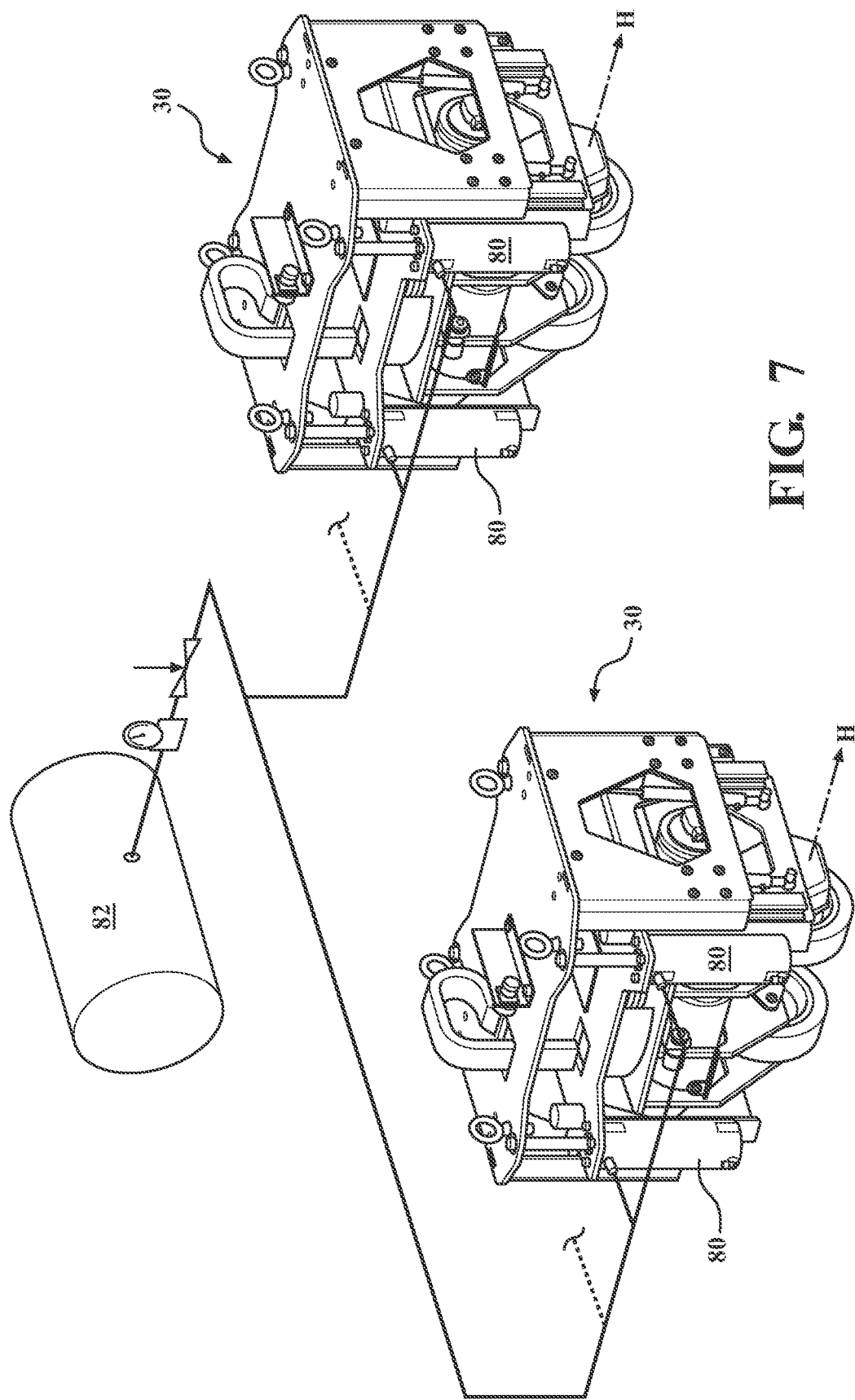
FIG. 7 is a simplified pneumatic schematic of the assembly of FIG. 3.
Figure 8:
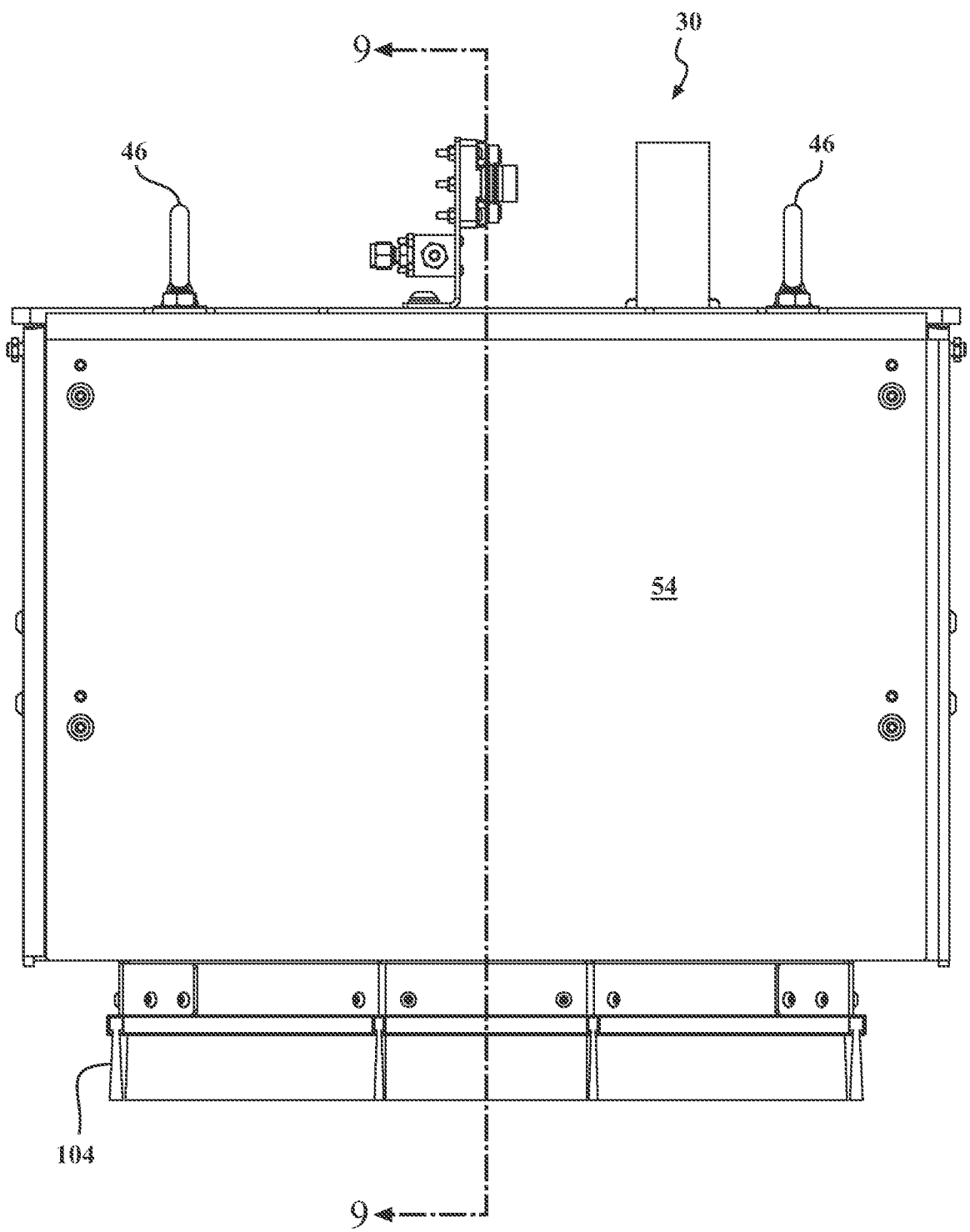
FIG. 8 is a front elevation of the steerable drive wheel assembly of FIG. 1.
Figure 9:
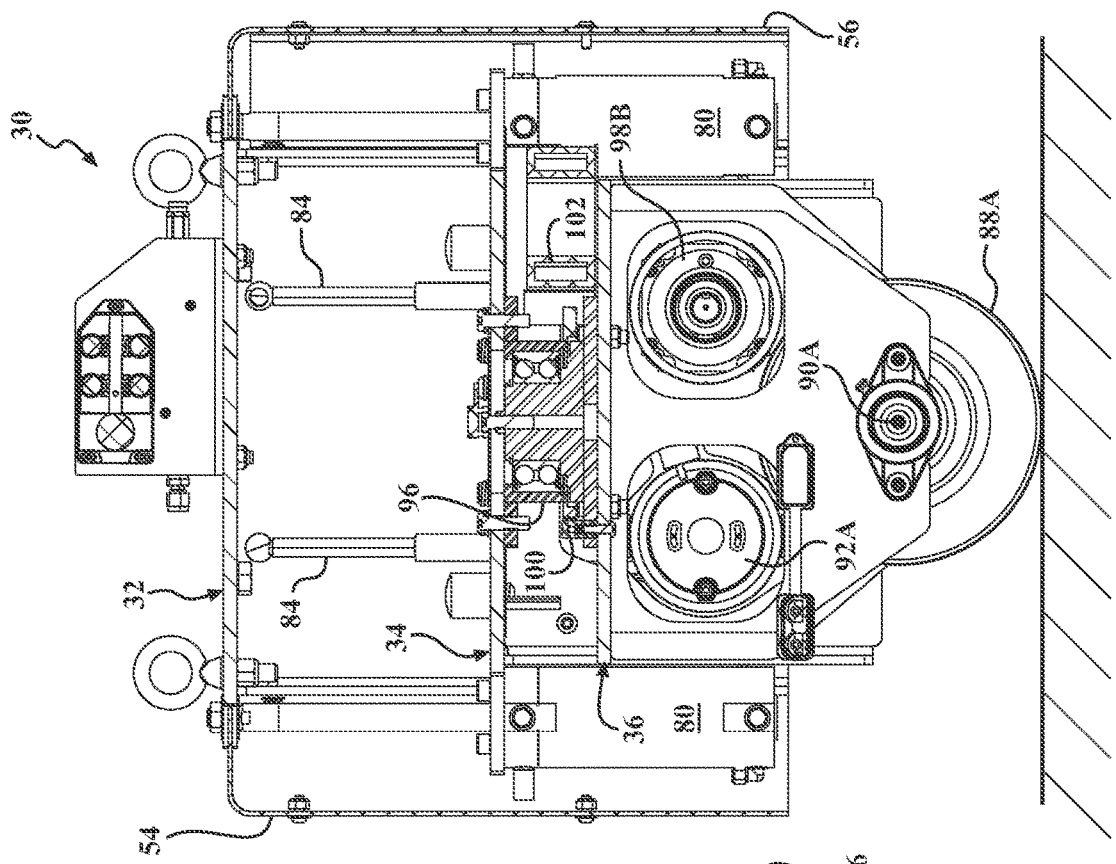
FIG. 9 is a cross-sectional view taken generally along lines 9-9 in FIG. 8 and showing the intermediate suspension module and drive module in a raised inoperative condition.
Figure 10:
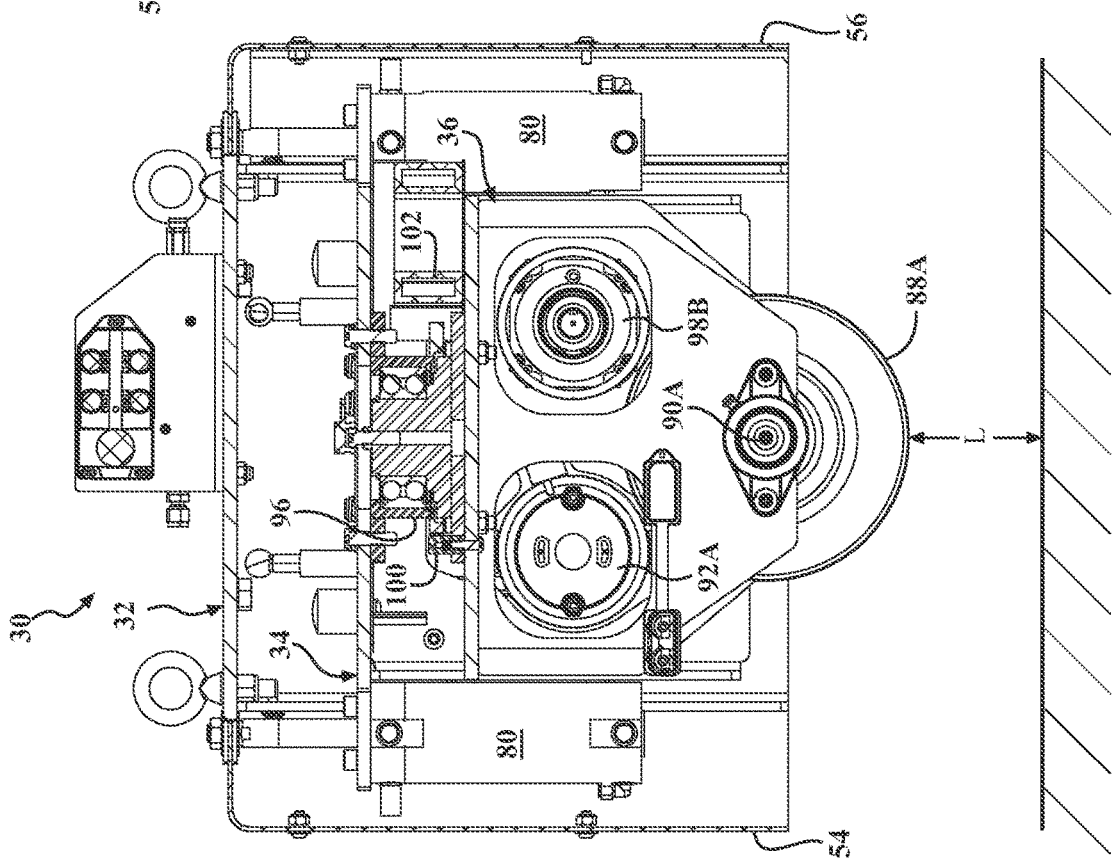
FIG. 10 is a view as in FIG. 9 but showing the intermediate suspension module and drive module in a lowered operative condition.

Each pneumatic cylinder carriers a double-acting piston, which is attached to the top 40 of the outer housing 32. Pressurized air, as from a source tank 82 (FIG. 7), is routed to the bottom of the double-acting piston where the natural compressibility of air forms a spring that will urge separation between the intermediate suspension module 34 and the outer housing 32, thus improving floor traction for the drive module 36. The double-acting nature of the illustrated pneumatic cylinders is that pressurized air can alternatively be routed to the top of each double-acting piston, in which case the intermediate suspension module 34 will be retracted into the outer housing 32, causing the drive module 36 to lift away from the floor by distance L as depicted in FIGS. 6 & 9. When the drive module 36 is thus lifted away from the floor, the lift cart 38 or other wheeled object to which the assembly 30 is attached may be free-wheeled without resistance or interaction of the drive wheel assembly 30.

Either alternatively to, or in conjunction with, double-acting pneumatic air cylinders 80, one or more retractor springs 84 may be operatively disposed between the outer housing 32 and the intermediate suspension module 34, as best seen in FIGS. 1 and 2. That is to say, a single-acting pneumatic cylinder could be substituted for the double-acting type and accomplish the aforementioned lifting of the drive module 36 away from the floor with the aid of retractor springs 84. The one or more retractor springs 84 are configured to counteract the constant traction-oriented biasing function of the biasing members 80. Thus, in the exemplary case of double-acting pneumatic air cylinders 80 like those shown throughout FIGS. 1-17, the retractor springs 84 supplement the lifting action generated by the air when raising the drive module 36 out of contact with the floor. And in the alternative case of single-acting pneumatic air cylinders 80 (not illustrated), the retractor springs 84 would provide the sole and exclusive energy needed to lift the drive module 36 out of contact with the floor. In this latter case, of course, the normal downward pressure generated by single-acting pneumatic air cylinders 80 would be required to overwhelm the retractor springs 84 in order to accomplish the desired floor traction in normal use of the drive wheel assembly 30.

As will be more fully described further below, the examples of FIGS. 18-22 depict embodiments in which the biasing members 80' are shown in the form of coil compression springs. In these configurations, the retractor springs 84 would not be used.

The drive module 36 is disposed below the intermediate suspension module 34 in an innermost sheltered region of the assembly 30 and, as previously mentioned, vertically moveable with the intermediate suspension module 34 relative to the outer housing 32. More specifically, the drive module 36 is nested inside intermediate suspension module 34, directly below the suspension plate 64 and in-between the left 72 and right 70 legs.

The drive module 36 has a base 86 disposed directly below the suspension plate 64 of the intermediate suspension module 34. Although its configuration is widely variable to suit the circumstances, in the illustrated examples the base 86 is generally flat and generally rectangular. As measured on a diagonal, the base 86 is smaller than the narrowest area inside the intermediate suspension module 34, such that the drive module 36 is free to rotate inside the intermediate suspension module 34 without restriction. The biasing members 80 are each operatively connected to the base 86. In the case of the pneumatic cylinders of FIGS. 1-17, the connection is made to the underside of the base 86. In the case of the coiled compression springs of FIGS. 18-22, the connection is made to the upper side of the base 86'.

The drive module 36 includes first and second drive subassemblies. Both of the first and second drive subassemblies are supported below the base 86. For convenience, numbered elements of the first drive wheel assembly are distinguished by an "A" suffix, whereas numbered elements of the second drive wheel assembly are distinguished by an "B" suffix. Each drive subassembly includes a wheel 88A, 88B. To be clear, the wheel of the first drive wheel assembly is 88A, and the wheel of the second drive wheel assembly is 88B. The first 88A and second 88B wheels are supported in side-by-side orientation for independent rotation about a common horizontal axis H upon respective axles 90A/B. In other contemplated embodiments (not illustrated), the wheel 88A, 88B could be supported on a common, unitary axle for independent rotation about the horizontal axis H.

Each drive subassembly includes a dedicated drive motor 92A/B. As is typical with most electric motors, each drive motor 92A/B has an armature and a stator body. The armatures of each drive motor 92A, 92B are disposed for rotation along respective axes that are parallel to one another and parallel to the common horizontal axis H. In some contemplated embodiments (not shown), one or both drive motors 92A, 92B could be oriented so that their armatures are not parallel to the common horizontal axis H. However, certain space-saving advantages can be achieved by mounting the drive motors 92A, 92B so that their armatures are parallel to the horizontal axis H. Notable, this orientation allows for the stator body of the first drive motor 92A to overlap, at least partially, the second wheel 88B. And similarly, the stator body of the second drive motor 92B can be mounted so as to overlap, at least partially, the first wheel 88B. This double-overlapping configuration of the two, independently controlled drive subassemblies can be appreciated from examination of the several drawings figures. As a consequence, relatively large drive motors 92A/B can be used to power the respective wheels 88A/B in a remarkably condensed package.

The first drive motor 92A is operatively connected to the first wheel 88A through a first transmission 94A. And likewise, the second drive motor 92B is operatively connected to its second wheel 88B through a second transmission 94B. The first 94A and second 94B transmissions can take many different forms, including meshing gears, friction plates, belt-and-pully arrangements, and the like. Direct drive arrangements are also possible, in which the transmission is effectively reduced to the mechanical coupling between armature and roller 88A/B. However, the illustrations show the first 94A and second 94B transmissions in the exemplary form of chain and sprocket drivetrains, which history has proven to be both a relatively inexpensive and robustly reliable option.

Figure 11:
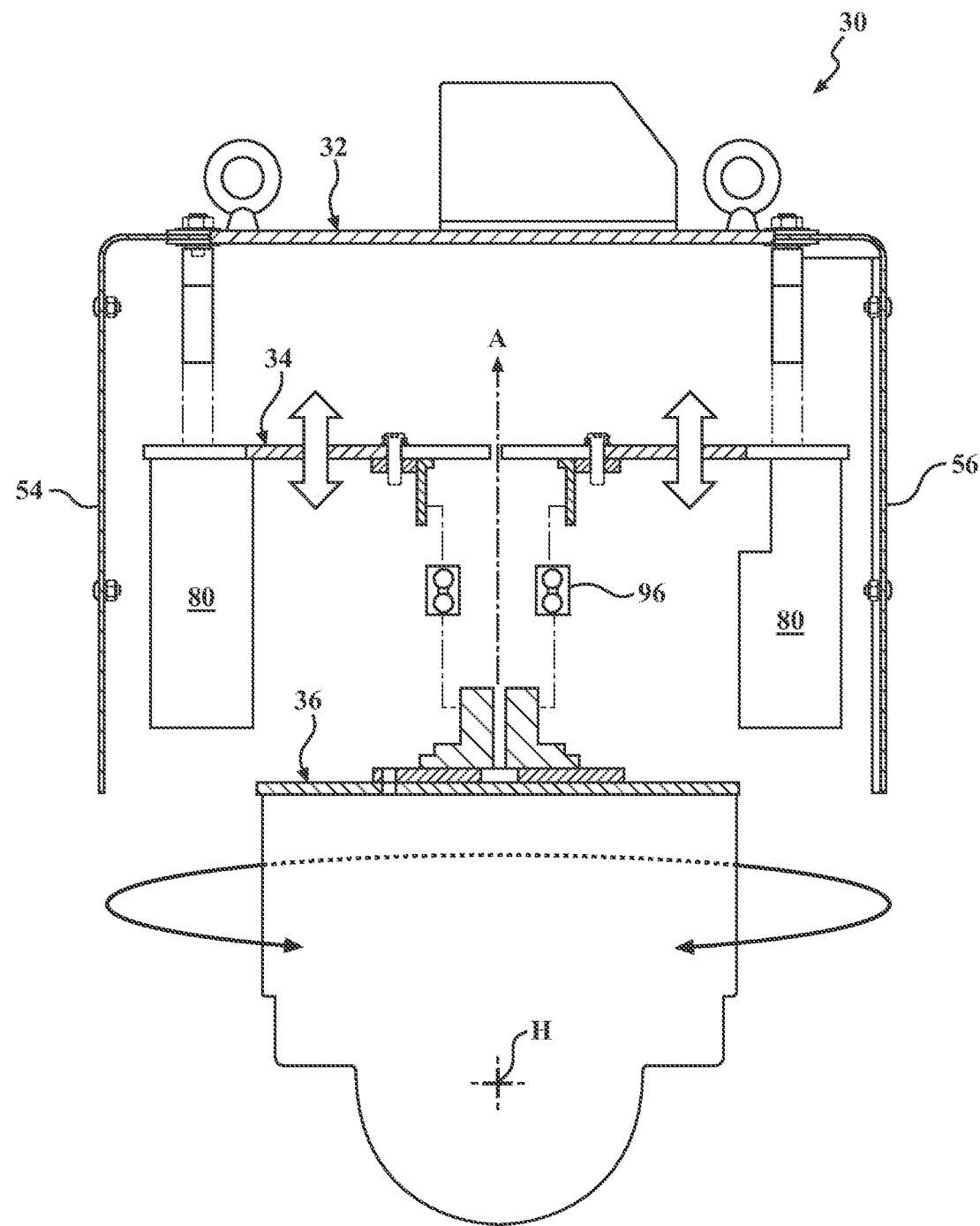
FIG. 11 is a simplified exploded view illustrating the outer housing, intermediate suspension module and drive module components.
Figure 13:
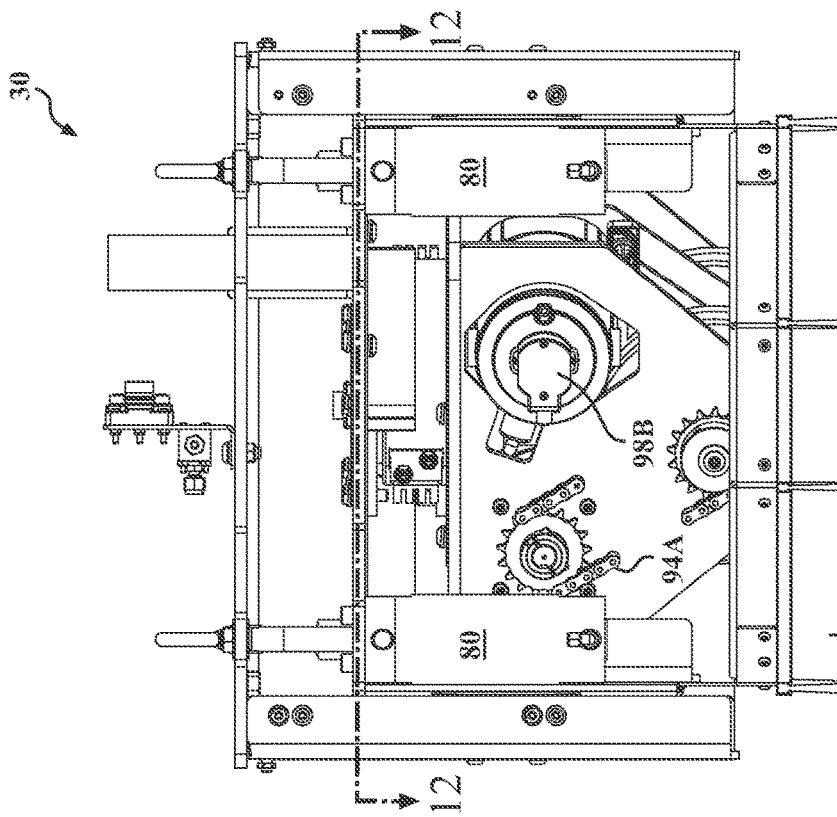
FIG. 13 is a side elevation of the steerable drive wheel assembly of FIG. 1 with the front panel removed to reveal the intermediate suspension module and drive module in the first exemplary operational angle of FIG. 12.

Turning next to the exploded view of FIG. 11, the assembly 30 can be seen to include a rotary bearing 96, operatively disposed between the drive module 36 and the intermediate suspension module 34. The rotary bearing 96 is also clearly visible in FIGS. 9, 10, 19 and 22. The rotary bearing 96 enables rotational movement of the drive module 36 relative to the intermediate suspension module 34 about a generally vertical steering axis V. The steering axis V passes centrally through the assembly 30, such that the first 88A and second 88B wheels will be equally laterally offset therefrom as perhaps best seen in the embodiment of FIG. 21. The rotary bearing 96 can be seen to reside in a horizontal plane or region in-between the suspension plate 64 and the base 86. Thus, the plane of the rotary bearing 96 is a horizontal space perpendicular to and centered about the vertical steering axis V.

The larger the diameter of the rotary bearing 96, the greater stability will be provided against racking as between the drive module 36 and intermediate suspension module 34. The rotatory bearing 96 is shown in the exemplary form of a double-stacked ball-type roller bearing, however other types of bearing interfaces, including but not limited to all roller-types as well as sliding or plain bearing types, magnetic types, and fluid types are certainly possible depending on the application and suitability for the particular design parameters.

Generally stated, in use when both motors 92A, 92B are energized to rotate in the (correspondingly) same direction at the same rate, the respective wheels 88A, 88B will also be turned in the same direction at the same rate causing the drive wheel assembly 30 to move in a straight line. To move the drive wheel assembly 30 in a curved line, both motors 92A, 92B are energized to rotate in the same direction but at different rates. This will cause one wheel 88A or 88B to turn faster than the other. The intermediate suspension module 34 can be made to pivot about the steering axis V by energizing the motors 92A, 92B to rotate in (correspondingly) opposite directions at the same rate. Precise angular movements can be accomplished by carefully limiting the angular rotations of each wheel 88A/B. And of course, a wide variety of complex motions are possible through the strategic rotational control of the respective wheels 88A, 88B.

Such precision control of the drive wheel assembly 30 depends on accurate control of the drive motors 92A, 92B. One of the key features of this invention pertains to its superior ability to accurately control the motion of the drive wheel assembly 30. This is accomplished by a plurality of strategically deployed sensors—that is, by a strategic sensor array. Specifically, a first angular velocity sensor 98A is operatively associated with the first drive motor 92A. And a second angular velocity sensor 98B is operatively associated with the second drive motor 92B. These angular velocity sensors 98A/B can be located in various convenient locations, including but not limited to at the rollers 88A/B or along components of the transmissions 94A/B. In the illustrated examples, however, the angular velocity sensors 98A/B are disposed between the armature and the stator body of the respective drive motor 92A/B, as shown in FIGS. 9, 10, 19 and 22.

Another member of the strategic sensor array is an angular position sensor 100. The angular position sensor 100 is operatively disposed between the drive module 36 and the intermediate suspension module 34. FIGS. 9, 10, 19 and 22 depict the angular position sensor 100 located in conjunction with the rotary bearing 96. This convenient location is by no means the only available location in which to mount the angular position sensor 100.

In theory, the motion of the drive wheel assembly 30 can be adequately controlled by the two angular velocity sensors 98A/B. Each angular velocity sensors 98A/B tracks the instantaneous rotation of each wheel 88A/B, from which can be computed liner velocity and also rotational position of the of the intermediate suspension module 34. But in practice, rollers 88A/B slip, floors are uneven and tread diameters get smaller. As a result, it has been found that precision control of the drive wheel assembly 30 requires real-time monitoring of the absolute angular position of the drive module 36 relative to the intermediate suspension module 34. According to the principles of this invention, the motion of the drive wheel assembly 30 can be better controlled by this strategic sensor array, which includes the ability to assess the rotational position of the intermediate suspension module 34, preferably in real-time, by the angular position sensor 100.

Figure 12:
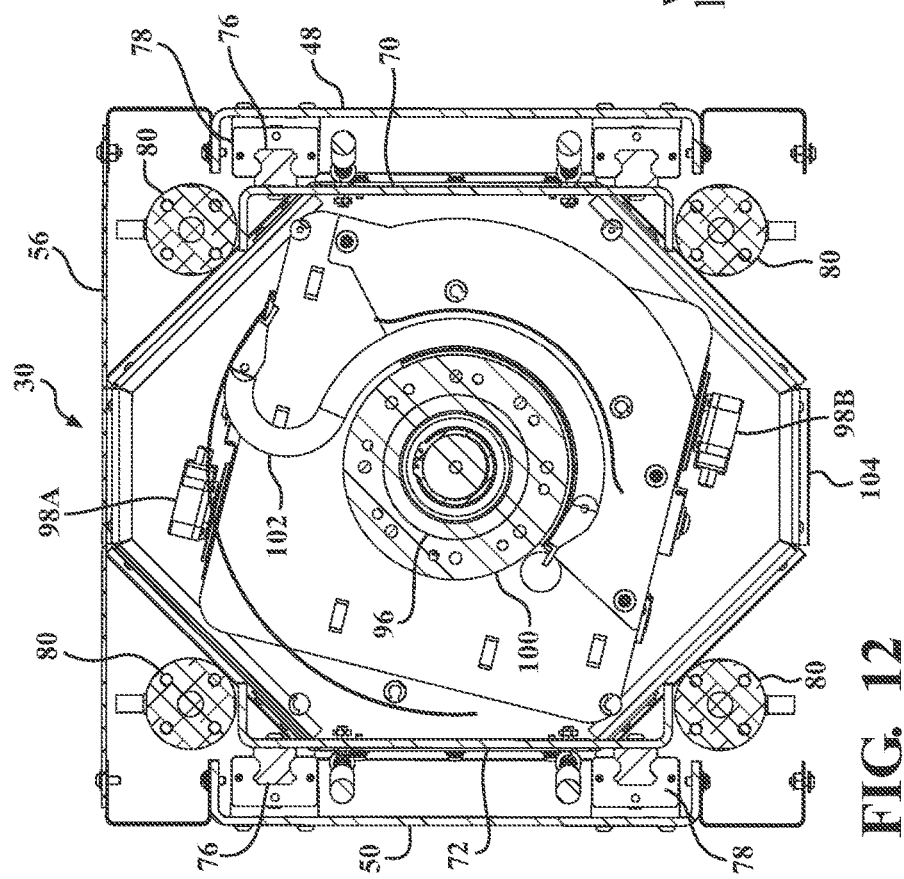
FIG. 12 is a cross-sectional view taken generally along lines 12-12 in FIG. 13 and showing the intermediate suspension module rotated within the outer housing oriented at a first exemplary operational angle.
Figure 17:
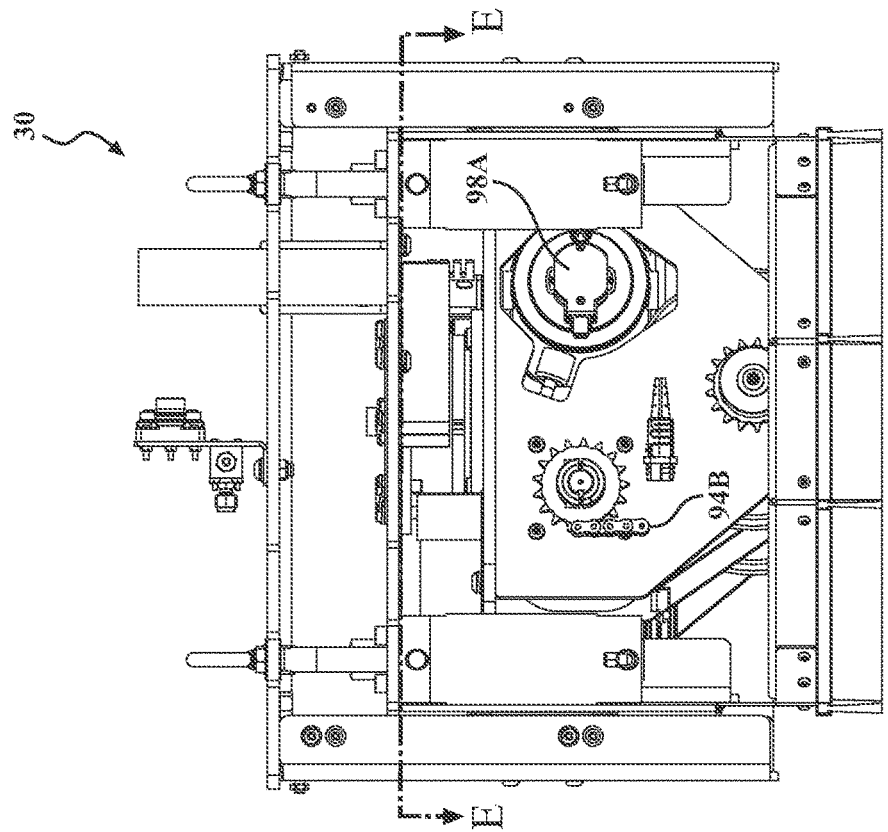
FIG. 17 is a side elevation of the steerable drive wheel assembly as in FIGS. 13 and 15 showing the intermediate suspension module and drive module in the third exemplary operational angle of FIG. 16.
Figure 16:
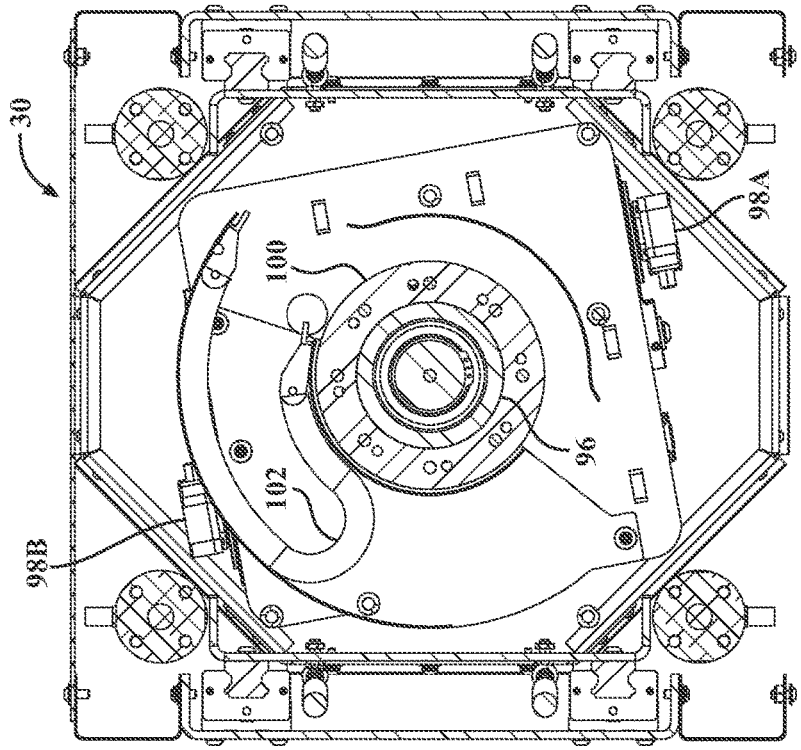
FIG. 16 is a cross-sectional view taken generally along lines 16-16 in FIG. 17 and showing the intermediate suspension module rotated within the outer housing oriented at a third exemplary operational angle.

The drive motors 92A/B and strategic sensor array 98A/B, 100 require electrical signals provided by wired connections. To complicate matters, the drive motors 92A/B and their angular velocity sensors 98A/B are designed to swivel inside the outer housing 32. And all of these elements 92A/B, 98A/B and 100 extend and retract relative to the outer housing 32. This complex array of motions demands a careful and effective wire management strategy. Such wire management strategy is accomplished by way of a serpentine energy chain 102 which is best seen in FIGS. 12, 14 and 16. The wires conducting electrical signal to/from the various elements 92A/B, 98A/B and 100 are supported within the articulating conduit of the serpentine energy chain 102. The particularly clever aspect of the serpentine energy chain 102 is in its placement generally co-planar with the rotary bearing 96. That is, the serpentine energy chain 102 is disposed in the plane of the rotary bearing 96. The illustrations depict the serpentine energy chain 102 laying entirely outside the rotary bearing 96. However, in contemplated embodiments where the rotary bearing 96 is of a sufficiently large diameter, the serpentine energy chain 102 could be located entirely on the interior of the rotary bearing 96.

The serpentine energy chain 102 comprises a plurality of jointed conduit segments fixed at an outer end thereof to the outer housing 32 and at an inner end to the intermediate suspension housing 34. By viewing FIGS. 12, 14 and 16 in rapid sequence, it can be observed that the outer end of the serpentine energy chain 102 remains stationary, which coincides with its connection to the outer housing 32. By comparison, it can also be observed that the inner end of the serpentine energy chain 102 rotates together with the intermediate suspension housing 34. The linked body in-between these two ends of the serpentine energy chain 102 wrap and unwrap around the rotary bearing 96 like a snake. This articulating conduit safely manages the electrical wires so that electricity and signals can be continuously provided to/from the several critical elements 92A/B, 98A/B and 100. Moreover, by positioning the serpentine energy chain 102 generally co-planar with the rotary bearing 96, maximum operating efficiency and efficacy can be achieved in a small package.

Before leaving FIGS. 1-17, it bears mentioning that an optional sweeper or bumper bar structure 104 may be extended like a low-hanging skit from the intermediate suspension module 34. The bumper bar structure 104 shown in the accompanying illustrations has a generally octagonal configuration when viewed from above. The bumper bar structure 104 provides a measure of additional structural rigidity to the intermediate suspension module 34, and also surrounds the wheels 88A/B so as to push obstructions encountered during travel out of the way.

Figure 18:
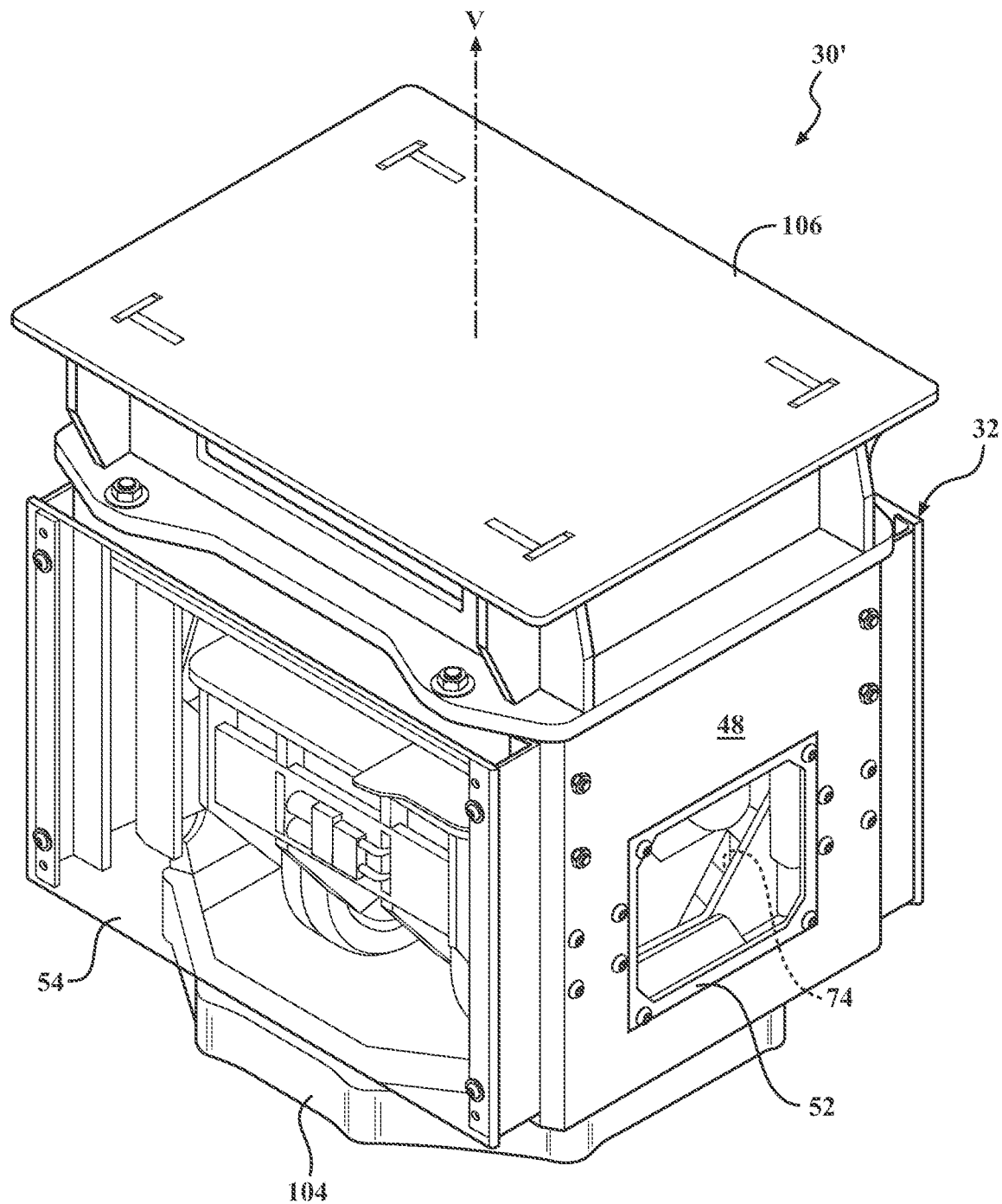
FIG. 18 is a perspective view of a steerable drive wheel assembly according to a second embodiment of the invention.
Figure 19:
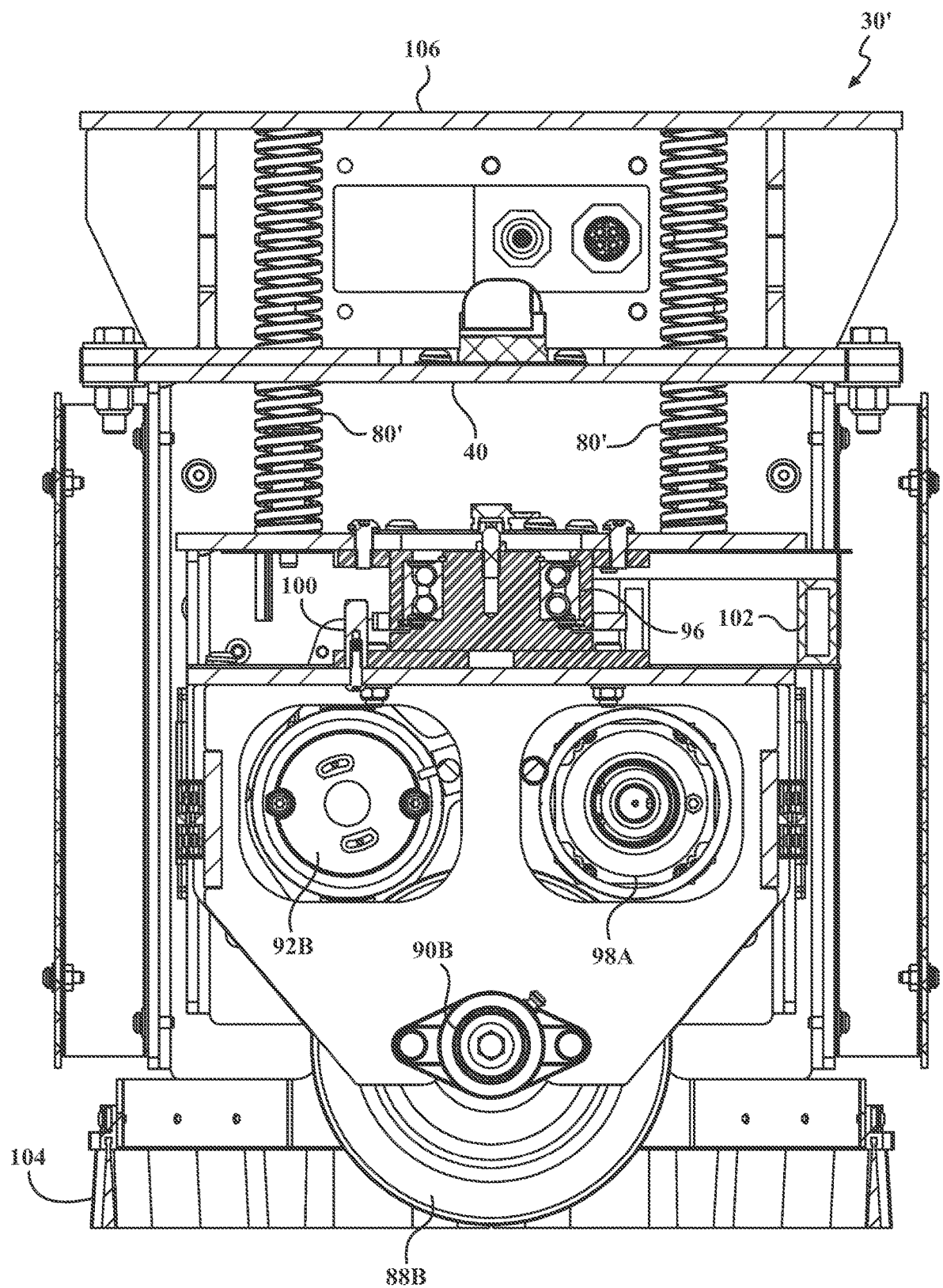
FIG. 19 is a cross-sectional, side elevation view of the steerable drive wheel assembly of FIG. 18.

Turning now to FIGS. 18-19, the steerable drive wheel assembly 30' is shown in the context of a second embodiment. In this example, the outer housing 32 includes a riser block 106 fixedly attached to the top 40. In some applications, it may be advisable to provide alternative mounting options as needed to suit the circumstances. This embodiment, together with the embodiment of FIGS. 3-6, will enable those of skill in the art to appreciate that add-on mounting features, like outriggers 62 and riser blocks 106, are easily adopted for use with the assembly 30'. And also, the embodiment of FIGS. 18-19 utilized coil compression springs for the biasing members 80'. Because of the added space afforded by the riser block 106, relatively long coil compression springs can be used if they are permitted to pass through the top 40.

Figure 20:
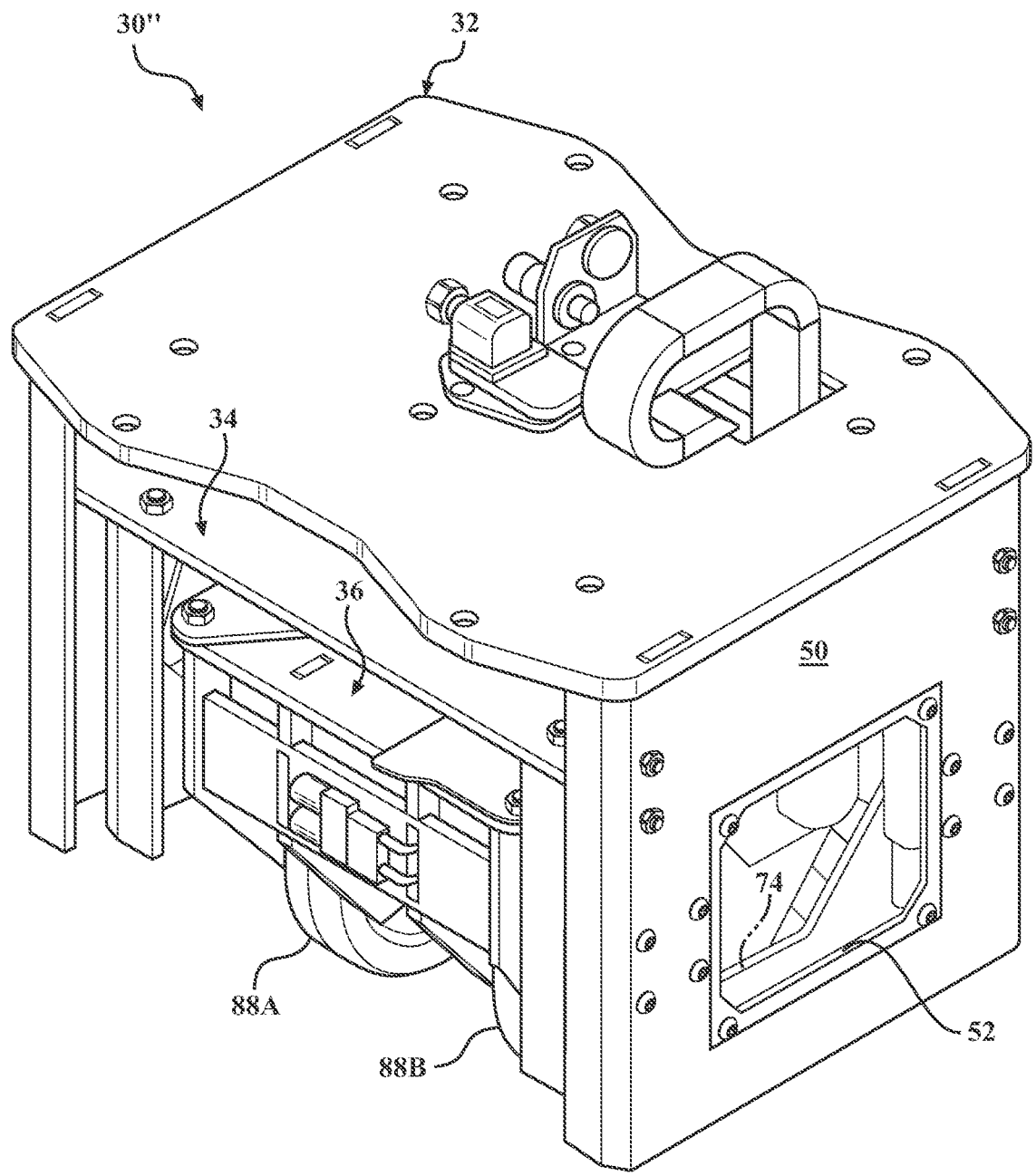
FIG. 20 is a perspective view of a steerable drive wheel assembly according to a third embodiment of the invention.
Figure 22:
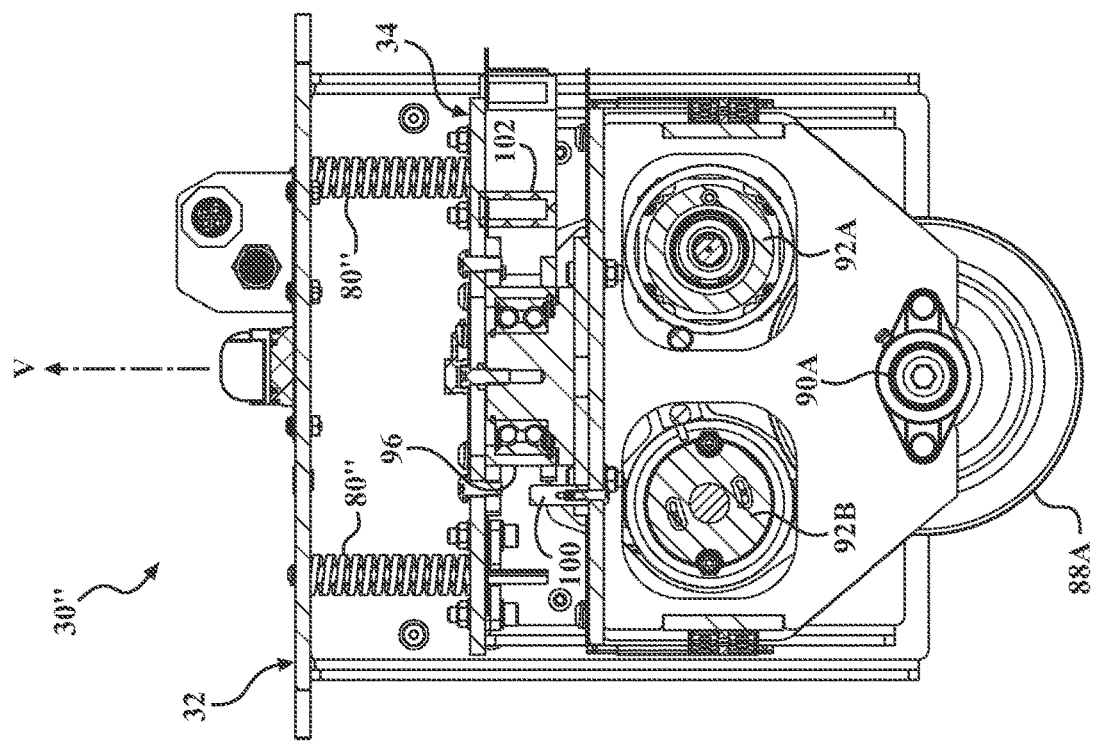
FIG. 22 is cross-sectional view taken generally along lines 21-21 in FIG. 20.
Figure 21:
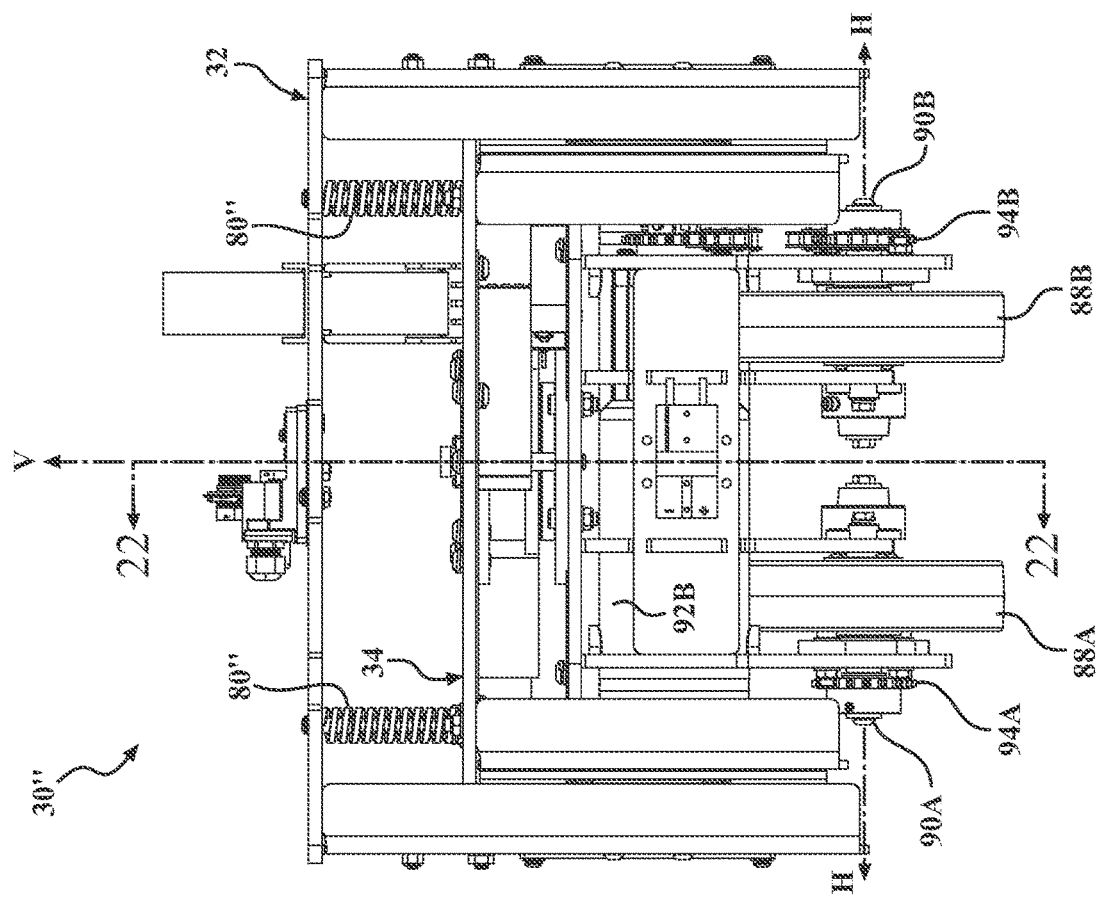
FIG. 21 is a cross-sectional, front elevation view of the steerable drive wheel assembly of FIG. 20.

In FIGS. 20-22, the steerable drive wheel assembly 30" is shown in the context of a third embodiment. This third embodiment is similar in most respects to the first embodiment of FIGS. 1-17, however coil compression springs are used for the biasing members 80" instead of pneumatic cylinders.

The drive wheel assembly 30, 30', 30" of the present invention is ideally suited for use in all types of motorized objects and carts, particularly in industrial and/or educational robotics applications. Of course, these are merely examples of the many possible applications of the principles of this invention. The drive wheel assembly 30, 30', 30" provides both motive force and directional control in a compact package. Due to the unique design, the drive wheel assembly 30, 30', 30" can be manufactured at low-cost and with low weight, because a dedicated steering motor is not needed (as in swerve drive systems). However, the drive wheel assembly 30, 30', 30" is exceptionally powerful for its small size owing to the use of two tractive motors 92A, 92B simultaneously driven through respective transmissions 94A, 94B. That is, the assembly 30, 30', 30" uses, in total, two drive motors 92A, 92B which together provide both steering and tractive functionality. Thus, the utilization rate of all motors 92A, 92B in the assembly 30, 30', 30" is effectively 100% at all times. The drive wheel assembly 30, 30', 30" is highly maneuverable, given the independent drive control of each wheel 88A, 88B, which inherently enables straight tracking with ease. The drive wheel assembly 30, 30', 30" is agile, robust and adaptable to nearly any conceivable application. The open frame construction with optional overlapping service windows 52, 74 makes the drive wheel assembly 30, 30', 30" easily serviceable. And the drive wheel assembly 30, 30', 30" can be easily scaled up or down to suit the application. Overall, the drive wheel assembly 30, 30', 30" overcomes most or all disadvantages inherent in prior art steerable drive wheel designs.

The drive wheel assembly 30, 30', 30" may be designed using different speed and position control strategies. The strategic sensor array 98A/B, 100 . . . The large number of electric components (motors and sensors) require a larger number of electrical wires capable of moving with the intermediate suspension module 34 and drive module 36. Therefore, the management of electric wires requires careful handling due to the rotational characteristics of the drive module 36 supported in the intermediate suspension module 34. The system assembly 30, 30', 30" includes an articulated wire harness for this purpose, in the form of a serpentine energy chain 102 that wraps and unwraps around the periphery of (alternatively inside) the rotary bearing 96.

The drive wheel assembly 30, 30', 30" can be used in many different and various kinds of industrial applications. Motorized carts can take many different forms. One exemplary application for this alternative drive wheel assembly 30, 30', 30" is the lift cart 38 of FIGS. 3-6. Depending on the configuration of the lift cart 38, one or more drive wheel assemblies 30, 30', 30" can be attached to provide steerable motive power thereby negating or augmenting the need for a forklift. Similarly, any wheeled object can be enhanced by the addition of one or more drive wheel assemblies 30, 30', 30".

In operation, an operator interacts remotely via a joystick or other type of steering control device (not show) to send directional and speed commands to the drive wheel assembly 30, 30', 30". Such commands may also include raise and lower directives if the drive wheel assembly 30 is fitted with lifting capability such as by double-acting pneumatic cylinders. With such commands issued, the one or more drive wheel assemblies 30, 30', 30" will cause the lift cart 38 or other wheeled object to move in the intended direction and desired speed.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A steerable drive wheel assembly comprising:
an outer housing defining a sheltered interior space, said outer housing including a top opposing left and right edges, a right stabilizer arm extending downwardly from said right edge of said top, a left stabilizer arm extending downwardly from said left edge of said top,
an intermediate suspension module disposed at least partially within said sheltered interior space of said outer housing,
a drive module disposed below said intermediate suspension module, said drive module including a first drive subassembly having a first wheel and a second drive subassembly having a second wheel, said first and second wheels supported in side-by-side orientation for independent rotation about a common horizontal axis, said first drive subassembly including a first drive motor operatively connected to said first wheel through a first transmission, said second drive subassembly a second drive motor operatively connected to said second wheel through a second transmission,
a rotary bearing operatively disposed between said drive module and said intermediate suspension module for enabling rotational movement of said drive module relative to said intermediate suspension module about a generally vertical steering axis,
a first angular velocity sensor operatively associated with said first drive motor, a second angular velocity sensor operatively associated with said second drive motor, and
an angular position sensor operatively disposed between said drive module and the intermediate suspension module,
wherein each of said first and second drive motors have an armature and a stator body, said first angular velocity sensor disposed between said armature and said stator body of said first drive motor, and said second angular velocity sensor disposed between said armature and said stator body of said second drive motor.

2. The assembly of claim 1, wherein each of said armatures are disposed for rotation in respective axes parallel to said common horizontal axis.

3. The assembly of claim 1, wherein said stator body of said first drive motor at least partially overlaps said second wheel, and sais stator body of said second drive motor at least partially overlaps said first wheel.

4. A steerable drive wheel assembly comprising:
an outer housing defining a sheltered interior space, said outer housing including a top having opposing left and right edges, a right stabilizer arm extending downwardly from said right edge of said top, a left stabilizer arm extending downwardly from said left edge of said top, an intermediate suspension module disposed at least partially within said sheltered interior space of said outer housing, a drive module disposed below said intermediate suspension module, said drive module including a first drive subassembly having a first wheel and a second drive subassembly having a second wheel, said first and second wheels supported in side-by-side orientation for independent rotation about a common horizontal axis, said first drive subassembly including a first drive motor operatively corrected to said first wheel through a first transmission, said second drive subassembly including a second drive motor operatively connected to said second wheel through a second transmission, a rotary bearing operatively disposed between said drive module and sad intermediate suspension module for enabling rotational movement of said drive module relative to said intermediate suspension module about a generally veritcal steering axis, a first angular velocity sensor operatively associated with said first drive motor, a second angular velocity sensor operatively associated with said second drive motor, an angular position sensor operatively disposed between said drive module and the intermediate suspsension module, further including a serpentine energy chain disposed generally co-planar with said rotary bearing, said serpentine energy chain comprising a plurality of jointed conduit segments fixed at one end thereof to said outer housing and at another end thereof to said intermediate suspension housing.

5. The assebly of claim 4, wherein said serpentine chain is located entirely outside of said rotary bearing.

6. A steerable drive wheel assembly comprising:

an outer housing defining a sheltered interior space, said outer housing including a top having opposing left and right edges, a right stabilizer arm extending downwardly from said right edge of said top, a left stabilizer arm extending downwardly from said left edge of said top, an intermediate suspension module disposed at least partially within said sheltered interior space of said outer housing, a drive module disposed below said intermediate suspension module, said drive module including a first drive subassembly having a first wheel and a second drive assembly having a second wheel, said first and second wheels supported in side-by-side orientation for independent rotation about a common horizontal axis, said first drive subassembly including a first drive motor operatively connected to said first wheel through a first transmission, said second drive subassembly including a second drive motor operatively connected to said second wheel through a second transmission, a rotary bearing operatively disposed between said drive module and said intermediate suspension module for enabling rotational movement of said drive module relative to said intermediate suspsension module about a generally vertical steering axis, a first angular velocity sensor operatively associated with said first drive motor, a second angular velocity sensor operatively associated with said second drive motor, an angular position sensor operatively disposed between said drive module and the intermediate suspension module, wherein said first and second wheels are equally laterally offset said vertical steering axis, further including at least one biasing member operatively disposed between said outer housing and said intermediate suspension module, at least one left linear guide bearing assembly operatively disposed between said outer housing and said intermediate suspension module, and at least one right linear guide bearing assembly operatively disposed between said outer housing and said intermediate suspension module.

7. A steerable drive wheel assebly comprising:

an outer housing defining a sheltered interior space, an intermediate suspension module disposed at least partially within said sheltered interior space of said outer housing, a drive module disposed below said intermediate suspension module, said drive module including a first drive subassembly having a first wheel and a second drive subassembly having a second wheel, said first and second wheels supported in a side-by-side orientation for independent rotation about a common horizontal axis, a rotary bearing operatively disposed between said drive module and said intermediate suspension module for enabling rotational movement of said drive module relative to said intermediate suspension module about a generally vertical steering axis, and a serpentine energy chain disposed generally co-planar with said rotary bearing, wherein said serpentine energy chain comprises a plurality of jointed conduit segments fixed at one end thereof to said outer housing and at another end thereof to said intermediate suspension housing.

8. A steerable drive wheel assembly comprising:

an outer housing defining a sheltered interior space, an intermediate suspension module disposed at least partially within said sheltered interior space of said outer housing, a drive module disposed below said intermediate suspension module, said drive module including a first drive subassembly having a first wheel and a second drive subassembly having a second wheel, and first and second wheels supported in side-by-side orientation for independent rotation about a common horizontal axis, a rotary bearing operatively disposed between said drive module and said intermediate suspension module for enabling rotational movement of said drive module relative to said intermediate suspension module about a generally vertical steering axis, and a serpentine energy chain disposed generally co-planar with said rotary bearing, wherein said serpentine energy chain is located entirely outside of said rotary bearing.

9. A steerable drive wheel assembly comprising:

an outer housing defining a sheltered interior space, an intermediate suspension module disposed at least partially within said sheltered interior space of said outer housing, a drive module disposed below said intermediate suspension module, said drive module including a first drive subassembly having a first wheel and a second drive subassembly having a second wheel, said first and second wheels supported in a side-by-side orientation for independent rotation about a common horizontal axis, a rotary bearing operatively disposed between said drive module and said intermediate suspension module for enabling rotational movement of said drive module relative to said intermediate suspension module about a generally vertical steering axis, and a serpentine energy chain disposed generally co-planar with said rotary bearing, wherein said first drive assembly includes a first drive motor operatively connected to said first wheel through a first transmission, said second drive subassembly includes a second drive motor operatively connected to said second wheel through a second transmission, each of said first and second drive motors having an armature and a stator body, and wherein each of said armatures are disposed for rotation in respective axes parallel to said common horizontal axis.

10. The assembly of claim 9, wherein said body of said first drive motor at least partially overlaps said second wheel, and said stator body of said second drive motor at least partially overlaps said first wheel.

11. The assembly of claim 9, further including a first angular velocity sensor operatively associated with said first drive motor, a second angular velocity sensor operatively associated with said second drive motor, and an angular position sensor operatively disposed between said drive module and the intermediate suspension module.

12. A steerable wheel assembly comprising:

an outer housing defining a sheltered interior space, an intermediate suspension module disposed at least partially within said sheltered interior space of said outer housing, at least one left linear guide bearing assembly operatively disposed between said outer housing and said intermediate suspension module, at least one right linear guide bearing assembly operatively disposed between said outer housing and said intermediate suspension module, at least one biasing member operatively disposed between said outer housing and said intermediate suspension module biasing relative movement between said intermediate suspension module and said outer housing through said left and right linear guide bearing assemblies, a drive module disposed below said intermediate suspension module, said drive module including a first drive subassembly having a first wheel and a second drive subassembly having a second wheel, said first and second wheels supported in side-by-side orientation for independent rotation about a common horizontal axis, said first drive subassembly including a first drive motor operatively connected to said first wheel through a first transmission, said second drive subassembly including a second drive motor operatively connected to said second wheel through a second transmission, each of said first and second drive motors having an armature and a stator body, a rotary being operatively disposed between said drive module and said intermediate suspension module enabling rotational movement of said drive module relative to said intermediate suspension module about a generally vertical steering axis, each of said armatures are disposed for rotation in respective axes parallel to said common horizontal axis, said stator body of said first drive motor at least partially overlaps said second wheel, and said stator body of said second drive motor at least partially overlaps said first wheel.

13. The assembly of claim 12, wherein said first and second wheels are equally laterally offset from said vertical steering axis.

14. The assembly of claim 12, wherein said first and second transmissions include respective chain and sprocket drivetrains.

15. The assembly of claim 12, further including a first angular velocity sensor operatively associated with said first drive motor, said first angular velocity sensor disposed between said armature and said stator body of said first drive motor, a second angular velocity sensor operatively associated with said second drive motor, said second angular velocity sensor disposed between said armature and said stator body of said second drive motor, and an angular position sensor operatively disposed between said drive module and the intermediate suspension module.

16. The assembly of claim 12, further including a serpentine energy chain disposed generally co-planar with said rotary bearing.

17. The assembly of claim 16, wherein said serpentine energy chain comprises a plurality of jointed conduit segments fixed at an outer end thereof to said outer housing and at an inner end thereof to said intermediate suspension housing, said serpentine energy chain being located entirely outside of said rotary bearing.

18. The assembly of claim 12, wherein said outer housing includes a top having opposing left and right edges, a right stabilizer arm extending downwardly from said right edge of said top, a left stabilizer arm extending downwardly from said left edge of said top, each of said left and right stabilizer arms including an external pass-through service window, said intermediate suspension module including a suspension plate disposed directly below said top of said outer housing, said suspension plate having opposing left and right edges, a right leg extending downwardly from said right edge of said suspension plate, a left leg extending downwardly from said left edge of said suspension plate, each of said left and right legs including an interior pass-through window at least partially overlapping said exterior pass-through service service windows of said respective said left and right stabilizer arms.

* * * * *